US012792502B2

(12) United States Patent
Yi et al.

(10) Patent No.: US 12,792,502 B2
(45) Date of Patent: Nov. 10, 2026

(54) VIRTUAL MEMORY MANAGEMENT METHOD AND ELECTRONIC DEVICE

(71) Applicant: Honor Device Co., Ltd., Shenzhen (CN)

(72) Inventors: Pengxiang Yi, Shenzhen (CN); Zefei Dou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 91 days.

(21) Appl. No.: 18/252,924

(22) PCT Filed: May 23, 2022

(86) PCT No.: PCT/CN2022/094563
§ 371 (c)(1),
(2) Date: May 15, 2023

(87) PCT Pub. No.: WO2022/257748
PCT Pub. Date: Dec. 15, 2022

(65) Prior Publication Data
US 2023/0418736 A1 Dec. 28, 2023

(30) Foreign Application Priority Data
Jun. 10, 2021 (CN) ......................... 202110651383.9

(51) Int. Cl.
*G06F 12/02* (2006.01)
*G06F 9/50* (2006.01)

(52) U.S. Cl.
CPC .......... *G06F 12/023* (2013.01); *G06F 9/5016* (2013.01)

(58) Field of Classification Search
None
See application file for complete search history.

(56) References Cited

U.S. PATENT DOCUMENTS 10,019,178 B2 7/2018 Lam et al.
10,037,143 B2 7/2018 Kang et al.
(Continued)

FOREIGN PATENT DOCUMENTS

CN 103999395 A 8/2014
CN 104375828 A 2/2015
(Continued)

OTHER PUBLICATIONS

NPL—Translation of Foreign Reference (Year: 2019).*
(Continued)

*Primary Examiner* — Hosain T Alam
*Assistant Examiner* — Ryan Dare
(74) *Attorney, Agent, or Firm* — Conley Rose, P.C.

(57) ABSTRACT

A memory management method includes starting a first application that comprises a first process and a second process, where a process name of the second process comprises a process name of the first process and a colon. The method also includes switching the first application to background and starting a second application. After the first application is switched to the background and the second application is started, a compression ratio of data of the first process is a first compression ratio, a compression ratio of data of the second process is a second compression ratio, and the first compression ratio is greater than the second compression ratio.

20 Claims, 13 Drawing Sheets

(56) References Cited

U.S. PATENT DOCUMENTS

| | | | | |
|---|---|---|---|---|
| 10,109,088 | B1 * | 10/2018 | Erickson | G06F 16/219 |
| 2015/0324605 | A1 | 11/2015 | Yoon et al. | |
| 2016/0117260 | A1 * | 4/2016 | Wu | G06F 12/023 713/193 |
| 2016/0259398 | A1 * | 9/2016 | Newham | G06F 1/32 |
| 2019/0205160 | A1 | 7/2019 | Chen et al. | |

FOREIGN PATENT DOCUMENTS

| | | | | | |
|---|---|---|---|---|---|
| CN | 104503740 | A | | 4/2015 | |
| CN | 107402891 | A | | 11/2017 | |
| CN | 109891390 | A | | 6/2019 | |
| CN | 110023906 | A | | 7/2019 | |
| CN | 110532197 | A | | 12/2019 | |
| CN | 110764906 | A | | 2/2020 | |
| CN | 110865884 | A | | 3/2020 | |
| CN | 110929478 | A | | 3/2020 | |
| CN | 111008079 | A | | 4/2020 | |
| CN | 111367828 | A | * | 7/2020 | G06F 12/023 |
| CN | 111381953 | A | | 7/2020 | |
| CN | 111880991 | A | | 11/2020 | |
| CN | 111913750 | A | | 11/2020 | |
| CN | 111949564 | A | | 11/2020 | |
| CN | 111966492 | A | | 11/2020 | |
| CN | 112463350 | A | | 3/2021 | |
| CN | 113722087 | A | | 11/2021 | |
| CN | 116107742 | A | | 5/2023 | |
| EP | 3812904 | A1 | * | 4/2021 | G06F 3/0604 |
| KR | 20150045348 | A | | 4/2015 | |
| WO | WO-2019028912 | A1 | * | 2/2019 | G06F 9/44 |
| WO | WO-2019071610 | A1 | * | 4/2019 | G06F 1/32 |
| WO | 2022257748 | A1 | | 12/2022 | |

OTHER PUBLICATIONS

Lyl0530, “Android multiple processes,” Retrieved from the internet: https://blog.csdn.net/lyl0530/article/details/81877598, Aug. 20, 2018, 4 pages. With English Translation.

Hashirikawa, “The five priorities of Android memory recovery (translation)” Retrieved from the internet: URL:https://blog.csdn.net/zhang_yanye/article/details/46482245, Jun. 13, 2015, 6 pages. With English Translation.

Lee, H., “Summary of Android multi-process one Generate multi-process android process attribute”; Retrieved from the internet: URL:https://blog.csdn.net/lixpjita39/article/details/77435156, Aug. 20, 2017, 22 pages. With English Translation.

Chen et al,., “Supporting mechanism for application-assisted memory management of processes group,” Computer Engineering & Science, vol. 36, No. 1, Jan. 2014, 6 pages. With English Translation.

* cited by examiner

VIRTUAL MEMORY MANAGEMENT METHOD AND ELECTRONIC DEVICE

CROSS-REFERENCE TO RELATED APPLICATIONS

This application is a U.S. National Stage of International Application No. PCT/CN2022/094563 filed on May 23, 2022, which claims priority to Chinese Patent Application No. 202110651383.9, filed with the China National Intellectual Property Administration on Jun. 10, 2021, both of which are incorporated herein by reference in their entireties.

TECHNICAL FIELD

This application relates to the field of terminals and communication technologies, and in particular, to a virtual memory management method and an electronic device.

BACKGROUND

Resources of a random access memory (random access memory. RAM) (also referred to as a memory) of an electronic device are fixed, for example, a configuration of a RAM of a mobile phone is 8 GB. A user starts a plurality of applications everyday during using of an electronic device, and each application occupies a specific RAM space.

When the RAM space reaches an upper limit of the electronic device, an operating system starts application cleaning to release the RAM space for a new application started by the user. If a memory of an application is cleaned and reclaimed, and the user clicks the application again, the cleaned data of the application needs to be regenerated to the memory, which greatly reduces a hot start speed of the application.

SUMMARY

This application provides a memory management method, which is used for improving a hot start speed of a background application.

According to a first aspect, this application provides a virtual memory management method, applicable to an electronic device, where the electronic device includes a first application, the first application includes a first process and a second process, the first process belongs to a first process group of the first application, the second process belongs to a second process group of the first application, and the first process is a process related to a main interface of the first application; and the method includes: cleaning, by the electronic device, data of processes in the second process group in a case that the first application is switched to background and meets a preset first memory reclaiming condition; and displaying, by the electronic device, the main interface of the first application by using data of processes in the first process group in a memory in response to an operation of switching the first application to foreground.

In the foregoing embodiment, processes of a first application are divided into a plurality of process groups, which include a first process group and a second process group. The first process group includes a first process related to a main interface of the first application, and the second process group includes a second process. In a case that the first application is switched to background and meets a first memory reclaiming condition, that is, the first application is in the background and memory is shortage, the electronic device cleans data of processes in the second process group but does not clean data of processes in the first process group. Therefore, when the first application is switched to foreground, the electronic device may directly display the main interface of the first application by using the data of the processes in the first process group in the memory. In this way, after memory cleaning is performed, and when the first application is hot started, data of the first process in the first process group in the memory may be directly used without re-generating the data of the first process for displaying the main interface of the first application in the memory, to greatly improve a hot start speed of the application.

With reference to some embodiments in the first aspect, in some embodiments, before the step of cleaning, by the electronic device, data of processes in the second process group in a case that the first application is switched to background and meets a preset first memory reclaiming condition, the method further includes: partially compressing, by the electronic device, the data of the processes in the first process group in the memory at a first ratio in a case that the first application is switched to the background and meets a preset second memory reclaiming condition, to obtain first group compressed memory data and first group uncompressed memory data; and partially compressing, by the electronic device, the data of the processes in the second process group in the memory at a second ratio, to obtain second group compressed memory data and second group uncompressed memory data, where the first ratio is greater than the second ratio; and a requirement of the preset second memory reclaiming condition is lower than that of the preset first memory reclaiming condition.

In the foregoing embodiments, before the memory is cleaned when the preset first memory reclaiming condition is met, and in a case that a preset second memory reclaiming condition with a lower requirement is met, the electronic device may first compress the data of the processes in the memory, and then clean the memory in a case that the preset first memory reclaiming condition is met. When compressing the data of the processes in the memory, the electronic device may partially compress the data of the processes in different groups by using different compression ratios: a relatively high compression ratio is used for compressing the data of the processes in the first process group and a relatively low compression ratio is used for compressing the data of the processes in the second process group. During memory reclaiming, the data of the processes in the second process group is cleaned. Therefore, the relatively low compression ratio is used, to reduce computing resources for compression and reduce an occupied memory space. In addition, the relatively high compression ratio is used for compressing the data of the processes in the first process group, to greatly reduce the occupied memory space.

With reference to some embodiments in the first aspect, in some embodiments, before the step of displaying, by the electronic device, the main interface of the first application by using data of processes in the first process group in a memory in response to an operation of switching the first application to foreground, the method further includes: dumping, by the electronic device, a part or all of the first group compressed memory data into a swap space of a storage device in a case that a preset third memory reclaiming condition is met, where a requirement of the preset third memory reclaiming condition is higher than that of the preset first memory reclaiming condition; and the displaying, by the electronic device, the main interface of the first application by using data of processes in the first process group in a memory in response to an operation of switching the first application to foreground further includes: reading, by the electronic device, data related to the first application from the swap space of the storage device and decompressing the data into the memory in response to the operation of switching the first application to the foreground, where the data related to the first application includes the part or all of the first group compressed memory data and displaying, by the electronic device, the main interface of the first application by using the data of the processes in the first process group in the memory.

In the foregoing embodiment, a part or all of the first group compressed memory data may be dumped into a swap space of a storage device without dumping the second group compressed memory data, to greatly reduce data read and written in the swap space and prolong a service life of the storage device. In addition, during hot start, the main interface of the first application may be displayed provided that only the data of the first process group in the swap space needs to be read and decompressed into the memory, to improve the hot start speed of the first application.

With reference to some embodiments in the first aspect, in some embodiments, the second process group further includes a third process of the first application; after the step of cleaning, by the electronic device, data of processes in the second process group, and before the step of dumping, by the electronic device, a part or all of the first group compressed memory data into a swap space of a storage device, the method further includes: adjusting, by the electronic device, the third process into the first process group in a case that the electronic device determines that the third process in the second process group is still run and the data in the memory is not cleaned; the partially compressing, by the electronic device, the data of the processes in the first process group in the memory at a first ratio, to obtain first group compressed memory data and first group uncompressed memory data further includes: partially compressing, by the electronic device, data of the first process and data of the third process in the memory at the first ratio, to obtain compressed memory data of the first process and compressed memory data of the third process as the first group compressed memory data and obtain uncompressed memory data of the first process and uncompressed memory data of the third process as the first group uncompressed memory data; and the dumping, by the electronic device, a part or all of the first group compressed memory data into a swap space of a storage device further includes: dumping, by the electronic device, a part or all of the compressed memory data of the first process and the compressed memory data of the third process into the swap space of the storage device.

In the foregoing embodiments, when a process in the second process group is continuously run and cannot occupy the memory and is cleaned, the process may be adjusted to the first process group, so that memory compression and dumping may be performed on the process, to ensure data integrity of the continuously run process and reduce the occupied memory space.

With reference to some embodiments in the first aspect, in some embodiments, the second process group further includes a third process of the first application; after the step of dumping, by the electronic device, a part or all of the first group compressed memory data into a swap space of a storage device, the method further includes: adjusting, by the electronic device, the third process into the first process group in a case that the electronic device determines that the third process in the second process group is still run and the data in the memory is not cleaned; and dumping, by the electronic device, a part or all of partially compressed data of the third process in the memory into the swap space of the storage device.

In the foregoing embodiments, when a process in the second process group is continuously run and cannot occupy the memory and is cleaned, the process may be adjusted to the first process group, so that memory compression and dumping may be performed on the process, to ensure data integrity of the continuously run process and reduce the occupied memory space.

With reference to some embodiments in the first aspect, in some embodiments, the electronic device uses a preset first compression rate when partially compressing the data of the processes in the first process group in the memory at the first ratio; and the electronic device uses a preset second compression rate when partially compressing the data of the processes in the second process group in the memory at the second ratio, where the preset first compression rate and the preset second compression rate are the same or different.

In the foregoing embodiment, the processes in different groups are compressed by using different compression rates, to improve the hot start speed of the electronic device and further reduce the memory occupied by the data of the processes.

With reference to some embodiments in the first aspect, in some embodiments, the method further includes: determining, by the electronic device according to application information of an installed application, a name of a main process of the installed application; storing a correspondence between the installed application and the main process of the installed application into an application and main process correspondence table, where the application and main process correspondence table includes a correspondence between the first application and the first process; and dividing, by the electronic device, the first process into the first process group and another process of the first application into the second process group according to the application and main process correspondence table in a case that the first application is run.

In the foregoing embodiment, the electronic device may determine a name of the main process of the first application by using information about an installed application, automatically divide the main process into the first process group, and divide another process of the first application into the second process group, to improve application grouping efficiency of the processes.

With reference to some embodiments in the first aspect, in some embodiments, the method further includes: adjusting, by the electronic device in a case of determining that a fourth process in the second process group meets a preset first condition, the fourth process into the first process group, where the fourth process is any process in the second process group; and adjusting, by the electronic device in a case of determining that a fifth process in the first process group meets a preset second condition, the fifth process into the second process group, where the fifth process is any process in the first process group.

In the foregoing embodiment, the electronic device may adjust, depending on whether a process state of an application process meets a preset first condition and a preset second condition, the process between the first process group and the second process group, to improve flexibility of process grouping, thereby ensuring normal running of the application and reduce the memory occupied by the application.

According to a second aspect, the embodiments of this application further provide an electronic device, including one or more processors and a memory, where the memory is coupled to the one or more processors, the memory is configured to store computer program code, and the computer program code includes computer instructions; the memory further stores a first application, the first application includes a first process and a second process, the first process belongs to a first process group of the first application, the second process belongs to a second process group of the first application, and the first process is a process related to a main interface of the first application; and the one or more processors invoke the computer instructions to cause the electronic device to perform the following steps: cleaning data of processes in the second process group in a case that the first application is switched to background and meets a preset first memory reclaiming condition; and displaying the main interface of the first application by using data of processes in the first process group in a memory in response to an operation of switching the first application to foreground.

With reference to some embodiments in the second aspect, in some embodiments, the one or more processors are further configured to invoke the computer instructions to cause the electronic device to perform the following steps: partially compressing the data of the processes in the first process group in the memory at a first ratio in a case that the first application is switched to the background and meets a preset second memory reclaiming condition, to obtain first group compressed memory data and first group uncompressed memory data; and partially compressing the data of the processes in the second process group in the memory at a second ratio, to obtain second group compressed memory data and second group uncompressed memory data, where the first ratio is greater than the second ratio; and a requirement of the preset second memory reclaiming condition is lower than that of the preset first memory reclaiming condition.

With reference to some embodiments in the second aspect, in some embodiments, the one or more processors are further configured to invoke the computer instructions to cause the electronic device to perform the following steps: dumping a part or all of the first group compressed memory data into a swap space of a storage device in a case that a preset third memory reclaiming condition is met, where a requirement of the preset third memory reclaiming condition is higher than that of the preset first memory reclaiming condition; and the one or more processors are further configured to invoke the computer instructions to cause the electronic device to perform the following steps: reading data related to the first application from the swap space of the storage device and decompressing the data into the memory in response to the operation of switching the first application to the foreground, where the data related to the first application includes the part or all of the first group compressed memory data; and displaying the main interface of the first application by using the data of the processes in the first process group in the memory.

With reference to some embodiments in the second aspect, in some embodiments, the second process group further includes a third process of the first application; the one or more processors are further configured to invoke the computer instructions to cause the electronic device to perform the following steps: adjusting the third process into the first process group in a case that the electronic device determines that the third process in the second process group is still run and the data in the memory is not cleaned; and the one or more processors are further configured to invoke the computer instructions to cause the electronic device to perform the following steps: partially compressing data of the first process and data of the third process in the memory at the first ratio, to obtain compressed memory data of the first process and compressed memory data of the third process as the first group compressed memory data and obtain uncompressed memory data of the first process and uncompressed memory data of the third process as the first group uncompressed memory data; and dumping a part or all of the compressed memory data of the first process and the compressed memory data of the third process into the swap space of the storage device.

With reference to some embodiments in the second aspect, in some embodiments, the second process group further includes a third process of the first application; the one or more processors are further configured to invoke the computer instructions to cause the electronic device to perform the following steps: adjusting the third process into the first process group in a case that the electronic device determines that the third process in the second process group is still run and the data in the memory is not cleaned; and dumping a part or all of partially compressed data of the third process in the memory into the swap space of the storage device.

With reference to some embodiments in the second aspect, in some embodiments, the one or more processors are further configured to invoke the computer instructions to cause the electronic device to perform the following steps: using a preset first compression rate when partially compressing the data of the processes in the first process group in the memory at the first ratio; and using a preset second compression rate when partially compressing the data of the processes in the second process group in the memory at the second ratio, where the preset first compression rate and the preset second compression rate are the same or different.

With reference to some embodiments in the second aspect, in some embodiments, the one or more processors are further configured to invoke the computer instructions to cause the electronic device to perform the following steps: determining, according to application information of an installed application, a name of a main process of the installed application; storing a correspondence between the installed application and the main process of the installed application into an application and main process correspondence table, where the application and main process correspondence table includes a correspondence between the first application and the first process; and dividing the first process into the first process group and another process of the first application into the second process group according to the application and main process correspondence table in a case that the first application is run.

With reference to some embodiments in the second aspect, in some embodiments, the one or more processors are further configured to invoke the computer instructions to cause the electronic device to perform the following steps: adjusting, in a case of determining that a fourth process in the second process group meets a preset first condition, the fourth process into the first process group, where the fourth process is any process in the second process group; and adjusting, in a case of determining that a fifth process in the first process group meets a preset second condition, the fifth process into the second process group, where the fifth process is any process in the first process group.

According to a third aspect, the embodiments of this application provide a chip system, applied to an electronic device, where the chip system includes one or more processors, and the processors are configured to invoke computer instructions to cause the electronic device to perform the method according to the first aspect and any possible implementation in the first aspect.

According to a fourth aspect, the embodiments of this application provide a computer program product including instructions. When run on an electronic device, the computer program product causes the electronic device to perform the method according to the first aspect and any possible implementation in the first aspect.

According to a fifth aspect, the embodiments of this application provide a computer-readable storage medium, including instructions. The instructions, when run on an electronic device, cause the electronic device to perform the method according to the first aspect and any possible implementation in the first aspect.

It may be understood that the electronic device provided in the second aspect, the chip system provided in the third aspect, the computer program product provided in the fourth aspect, and the computer storage medium provided in the fifth aspect are all configured to perform the method provided in the embodiments of this application. Therefore, for beneficial effects that can be achieved therein, refer to beneficial effects in the corresponding method, and details are not described herein again.

DESCRIPTION OF EMBODIMENTS

Figure 1:
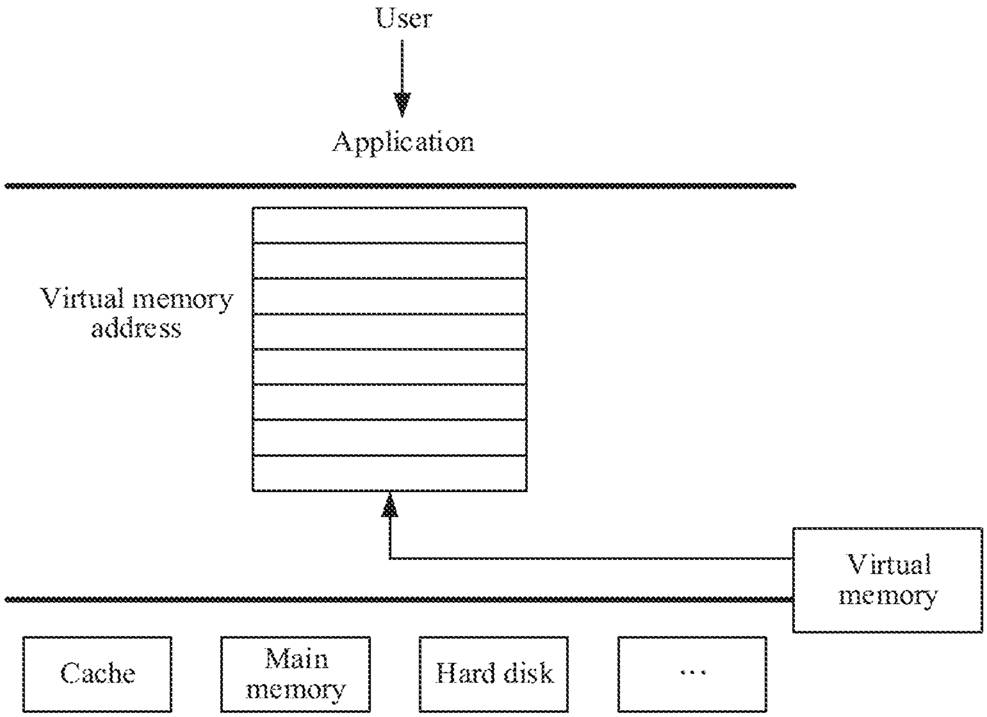
FIG. 1 is a schematic diagram of a relationship among an application, a virtual memory, and a physical memory according to an embodiment of this application.

Terms used in the following embodiments of this application are only intended to describe particular embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should be further understood that the term "and/or" used herein indicates and includes any or all possible combinations of one or more listed items.

The terms "first" and "second" mentioned below are merely intended for a purpose of description, and shall not be understood as an indication or implication of relative importance or implicit indication of the quantity of indicated technical features. Therefore, a feature defined to be "first" or "second" may explicitly or implicitly include one or more features. In the description of the embodiments of this application, unless otherwise stated, "A plurality of" refers to two or more.

Because application of memory management is involved in the embodiments of this application, for ease of understanding, related terms and concepts involved in the embodiments of this application are first described below.

(1) Memory Dump

In the embodiments of this application, a process of storing data temporarily unavailable in a memory into a swap in a storage device is referred to as memory dump.

(2) Memory Page

An operating system divides a memory space into pages having a same size for management, and the pages are referred to as memory pages.

According to different operating system settings, memory pages in operating systems of different electronic devices may have different sizes, for example, 4 KB, 8 KB, or 16 KB.

In addition, in an operating system of an electronic device, a memory page having a fixed size is used as a smallest allocation unit of a memory space, and data in the electronic device is managed in the form of the memory page. Therefore, the memory page may also be used as a unit of a data volume.

The memory paging management is described below.

2.1. Memory Management

Two important concepts in the operating system are a central processing unit (CPU) and a memory. The CPU is configured to execute instructions. The memory is configured to store computer executable program code, an operating system, a program, data, and the like. The memory may also be referred to as an internal memory.

The memory has limited resources, if a process occupies a relatively large memory, which is even greater than a physical memory, and a plurality of processes need to be performed simultaneously, memory management needs to be involved.

Ideally, the expectation of a user for the memory is a large capacity, a high speed, and persistence, but in reality, the memory is a memory architecture formed by a cache, a main memory, and a disk. In the architecture, the cache has a low capacity, a fast read-write speed but a high cost, the main memory has a middle speed, a middle capacity, and a middle cost, and the disk has a large capacity, good persistence, but a low speed.

The memory management is to provide a unified abstraction for "users", shield a difference among the cache, the main memory, and the disk, and even fail to perceive their existence. The users do not need to worry about whether a program is stored in the cache, the main memory, or the disk provided that results of running and outputting are the same.

In addition, when an operating system executes a program of a plurality of processes simultaneously, it needs to be ensured that the processes do not interfere with each other, that is, one process cannot access a memory space of another process. When specific memory data is read and written in the program, the memory data cannot be directly mapped to a physical memory, that is, a memory address issued by the program and the physical memory need to be independent.

The requirements of the memory management may be met by using a virtual memory.

2.2. Virtual Memory

The virtual memory is used to prevent the program from directly dealing with the physical memory, and make a unified abstraction of the cache, the main memory, and the disk, so that the program can break through a size limit of the physical memory. Certainly, the program is still subject to the size limit of the virtual memory.

After the virtual memory is used, the memory address seen in the program is a virtual memory address, and read and write of the virtual memory address by the program is mapped to the actual physical memory. This mapping is referred to as translation. This translation is completed by a memory management unit (memory management unit, MMU). The MMU receives a virtual address sent by the CPU, translates the virtual address into a physical address and sends the physical address to the memory. The memory performs corresponding access according to the physical address and then reads or writes relevant data.

FIG. 1 is a schematic diagram of a relationship among an application, a virtual memory, and a physical memory according to an embodiment of this application. Physical memories such as a cache, a main memory and a hard disk in an electronic device may be uniformly abstracted as a virtual memory, providing a virtual memory address to an application in the electronic device. The reading and writing of the virtual memory address by a user through an application is mapped to an actual physical memory.

2.3. Memory Space Paging Management

The core of memory space paging management is to divide both a virtual memory space and a physical memory space into pages having a same size, and use a page as a smallest allocation unit of a memory space, and a page of a program may be stored in any physical page.

A contiguous virtual memory space may be mapped to an unnecessarily contiguous physical memory space through the memory space paging management. This allows continuous data segments in a process to be stored in a discontinuous physical memory, making the memory space management more flexible.

Figure 2:
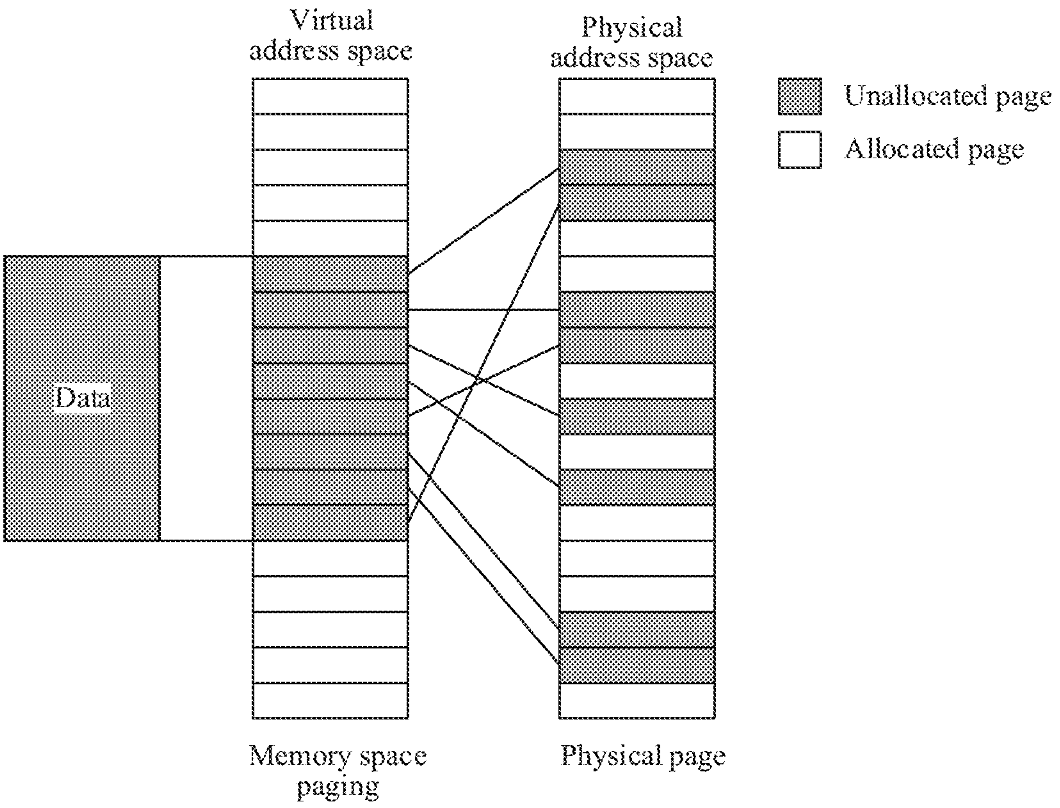
FIG. 2 is an exemplary schematic diagram of memory paging management according to an embodiment of this application.

FIG. 2 is an exemplary schematic diagram of memory paging management according to an embodiment of this application. Data may be split into memory pages with a size through a paging mechanism and contiguous addresses in a virtual address space are allocated. These memory pages of which addresses are contiguous in the virtual address space may be broken up and allocated to unallocated pages in the physical address space.

In some embodiments of this application, a memory page may also be referred to as a page, and is not described subsequently.

According to different attributes of the memory pages, some memory pages may be referred to as file pages and some memory pages may be referred to as anonymous pages. This is not limited herein.

(3) File Page

Generally, a file page in a memory is a file buffer, that is, a file-type memory page, and is a memory page (also referred to as a permanent page) used for storing file data and serves to reduce access to a storage device during reading and writing of files. In memory management, most of the file pages may be reclaimed directly and may be re-read from the storage device later when needed.

(4) Anonymous Page

Generally, heap memory dynamically allocated by an application, that is, anonymous pages in memory management, are likely to be accessed again and are not generally reclaimed directly.

An application scenario involved by this application is exemplarily described below.

Figure 3:
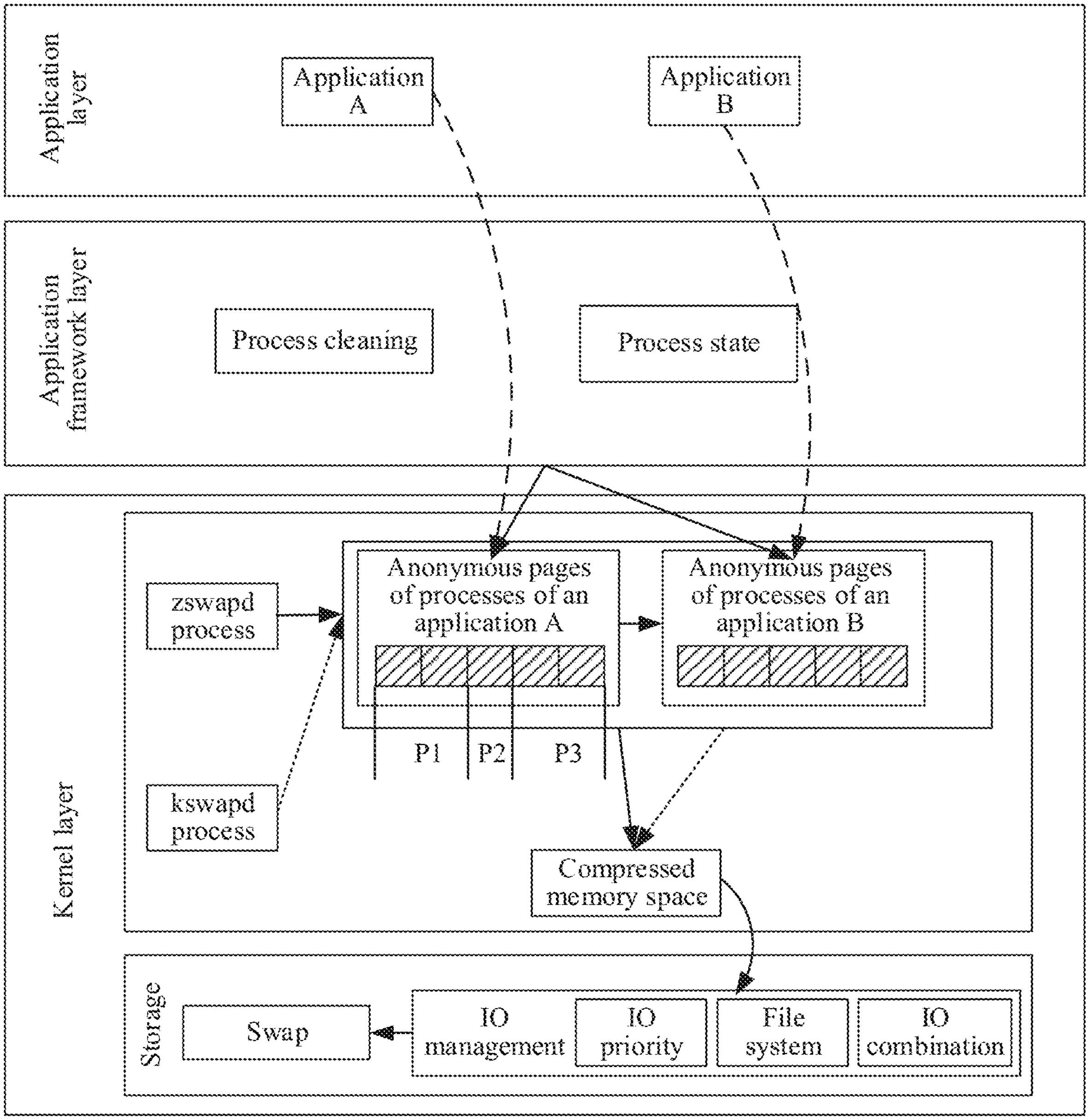
FIG. 3 is a schematic diagram of an information flow direction in an exemplary application scenario according to an embodiment of this application.

FIG. 3 is a schematic diagram of an information flow direction in an exemplary application scenario according to an embodiment of this application.

An application framework layer may include a process state module, a process cleaning module, and the like.

The process state module is configured to collect, recognize, and manage a process state and provide an interface for another module to query the process state.

The process cleaning module is configured to clean a process in a system, to reduce memory pressure of an electronic device and provide a stable performance guarantee to the electronic device.

For example, when a user starts an application X to view a picture, the process state module may mark a process of the application X as a viewing state. In this case, the user starts an application Y to play music, the application X is switched to background, and the process state module may mark a process of the application Y as a playing state, and update the process of the application X as an idle state. After the user cumulatively starts a plurality of applications, the process cleaning module regularly queries a memory situation in a kernel node and actively cleans processes if sensing a low memory state of the system. The process cleaning module may invoke the interface provided by the process state module through a function, determine that the process of the application X is in the idle state, and clean memory data of the application X; and determine that the process of the application Y is in the playing state and does not clean memory data of the application X.

For example, an application layer of the electronic device may include an application A and an application B. After the application A and the application B run, related processes of the application A and the application B occupy a specific capacity of memory at a kernel layer, including anonymous pages of processes (for example, processes P2, P2, and P3) of the application A and anonymous pages of processes of the application B.

If the electronic device starts a new application, so that when a total occupied memory capacity of the electronic device reaches a threshold A, a compression process (for example, a kswapd process) in the kernel layer compresses some anonymous pages into a compressed memory space (for example, ZRAM), and a swap out process (for example, a zswapd process) in the kernel layer may also swap out some or all of the compressed anonymous pages in the compressed memory space into a swap, so that an occupied memory space may be reduced.

If the occupied memory capacity of the electronic device continues to increase, the data compressed into the compressed memory space continues to increase, and when an occupied capacity of the compressed memory space reaches a threshold B, the electronic device may dump the compressed memory data in the compressed memory space into the swap of a storage device through an IO interface of the storage device.

If the electronic device needs to use the data in the swap, the electronic device reads the data in the swap into the memory again.

In an implementation, when a process of an application (for example, the application A) is managed, all processes of the application are placed in a memory group. In this way, when anonymous pages of the processes related to the application are dumped, the anonymous pages may be continuously stored in the swap of the storage device, and when the application is hot started, the anonymous pages of the processes related to the application can be sequentially and continuously read back to the memory.

Figure 4:
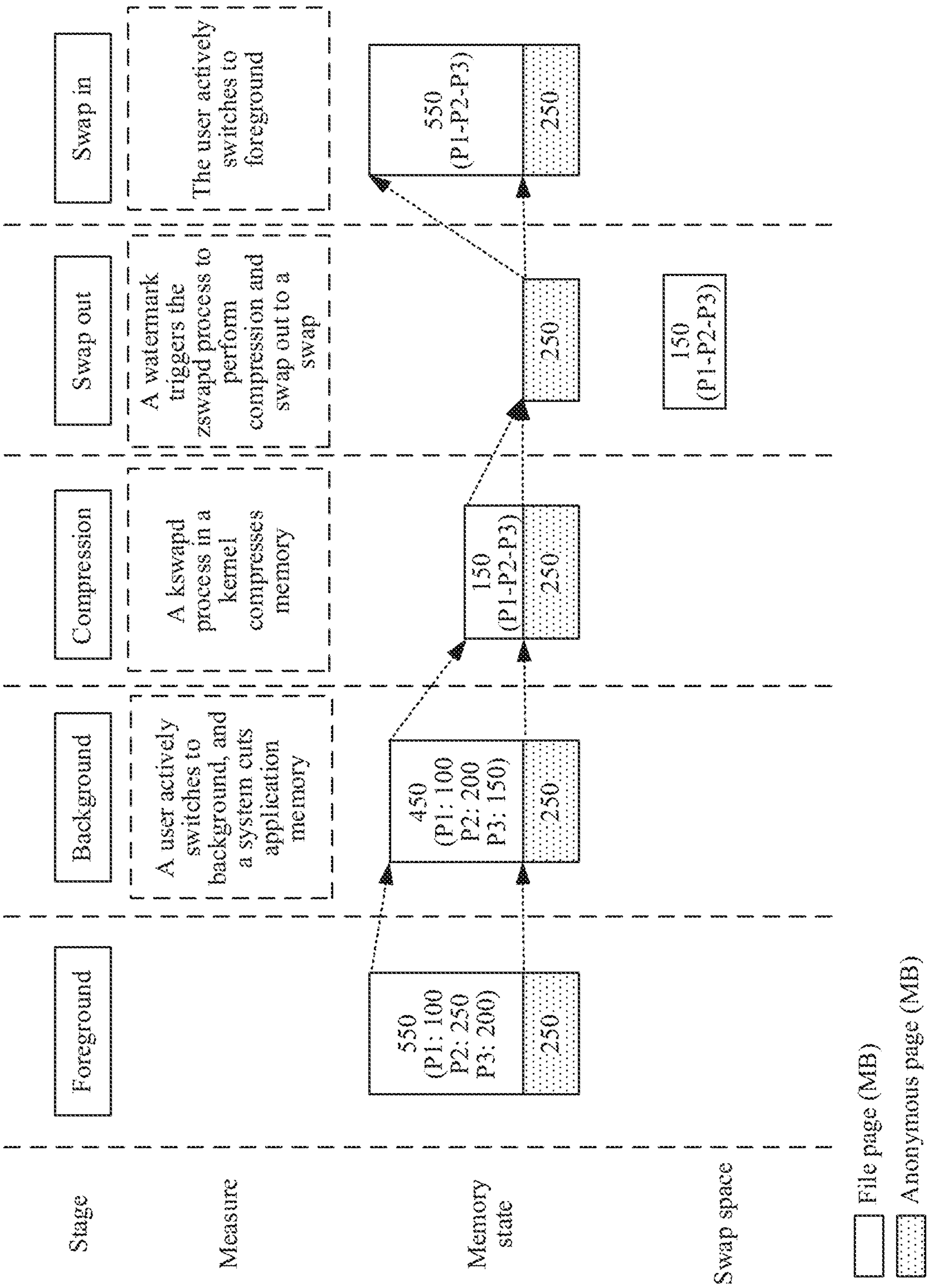
FIG. 4 is an exemplary schematic diagram of a memory state after memory management is performed on an application A at each stage in a memory management implementation.

For example, a memory management mode in the implementation is exemplarily described by using an example in which memory management is performed on an application A at each stage. FIG. 4 is an exemplary schematic diagram of a memory state after memory management is performed on an application A at each stage in a memory management implementation.

A running process of the application A for a period of time is divided into five stages: foreground, background, compression, swap out, swap in (hot start).

At the foreground stage, when a user starts the application A, the application A starts three processes: P1, P2, and P3. The three processes are put into a memory group, so that a system determines that the application A corresponds to which processes and reads and writes memory data of the application A in sequence. Anonymous pages of the three processes occupy memory spaces of 100M, 250M, and 200M in a memory respectively, and the anonymous pages of the application A occupy a total memory space of 550M. After the application A is started, related files may further be cached into a memory. It may be assumed that the application caches 250M data into the memory, so that file pages of the application A occupy a memory space of 250M. The application A occupies a total memory space of 800M.

Because a memory space of the file pages in the memory is reclaimed in an inherent rule, for ease of description, the memory space occupied by the file pages of the application A in this process is set not to change in this embodiment of this application.

At the background stage, after the user has used the application A for a period of time, and if the user wants to use another application such as an application B, the user opens the application B. In this case, the application A is switched from running in foreground to running in background. Because it is no longer necessary to display some content in real time during running in the background, the electronic device may cut some data that is unavailable in the application A in this case in the memory. For example, if the application A is a photo viewing application, the photo viewing application includes a main interface display process P1, a photo preview process P2, and a photo data cache process P3. After opening the application A to view 10 photos, the user switches the application A to the background, and does not start the application A for a period of time. When the memory is shortage, the electronic device system triggers memory reclaiming of a process of the application A, and the application A may actively detect a state of the process started by the application A, and cut both data generated when first 5 photos of the 10 photos are previewed in the photo preview process P2 and data of the first 5 photos cached in the photo data cache process P3. For example, the process P2 and the process P3 of the application A may each cut 50M unnecessary data from the memory. In this case, spaces occupied by the processes P1, P2, and P3 of the application A in the memory are 100M, 200M, and 150M respectively, occupying a total memory space of 450M.

It may be understood that whether an application cuts memory data occupied by a process of the application is determined depending on a rule in the application. During actual application, for some applications, after the applications are switched to the background, the applications may not cut memory data occupied by processes of the applications, which is not limited herein.

At the compression stage, if the user opens another application, which occupies more memory, the memory pressure of the electronic device is increased. When an occupied ratio of the total memory space exceeds a preset threshold A, the electronic device compresses data of an application that is not in the foreground in the memory. For example, 450M data of the application A occupying the memory may be compressed into 150M compressed data according to a compression rate of 1/3 and put into the compressed memory space (for example, ZRAM) in the memory. In this case, an occupied space of the three processes P1, P2, and P3 of the application A in the memory is 150M.

At the swap out stage, if the user continues to open another new application, which occupies more memory, the memory pressure continues to increase. When an occupied ratio of the compressed memory space also exceeds a preset threshold B, the electronic device may swap out a part of data in the compressed memory space of the memory to the swap of the storage device. Therefore, the electronic device swaps out 150M data of the application A in the compressed memory space to a swap space. In this case, a space occupied by the anonymous pages of the application A in the memory is 0. An occupied space in the swap space of the storage device is 150M.

In some embodiments, when data in the compressed memory space is swapped out to the swap space, the data may also be compressed again. For example, the 150M data in the compressed memory space may be compressed into 50M data again and stored in the swap space. In this case, an occupied space of the anonymous pages of the application A in the swap space of the storage device is 50M.

At the swap in stage (or referred to as the hot start stage), if the user wants to use the application A again in this case, the user actively switches the application A to the foreground. The electronic device reads all the dumped anonymous pages of the application A from the swap space and decompress the dumped anonymous pages into the memory. In this case, the 450M data of the processes P1, P2, and P3 of the application A are restored to the memory and run, and the cut 50M data of the process P2 and the cut 50M data of the process P3 are re-generated, which occupy a total memory capacity of 550M, and a user interface of the application A is displayed.

It may be understood that if the application A does not cut the memory data of the processes P2 and P3 at the background stage, at the swap in stage, the electronic device reads all the dumped anonymous pages of the application A from the swap space and directly decompresses the dumped anonymous pages into the memory to restore all the data of the application A in the memory to display the user interface of the application A.

In the scenario of this implementation, after the user switches the application A to the background for a period of time, the electronic device writes the 150M compressed anonymous page data of the application A into the swap space. When the user switches the application A back to the foreground (also referred to as hot start of the application), the electronic device needs to quickly read the 150M anonymous page data of the three processes of the application A in the swap into the memory. In this way, on one hand, the 150M data needs to be read and written in the swap space of the storage device, which reduces the service life of the storage device. On the other hand, however, because the reading speed of the storage device is much slower than that of the memory, it needs to be delayed for a period of time to complete the hot start of the application. An example in which the storage device is a universal flash storage (universal flash storage, UFS) 3.1 device is used, a sequential reading speed is about 1 GB/s, the memory size of the swap to which the application A is dumped is 150 MB, and it takes 150 ms to read the memory data completely from the UFS. Therefore, when the application A is hot started, there is a delay of at least 150 ms, and the user can clearly feel the jam.

Figure 5:
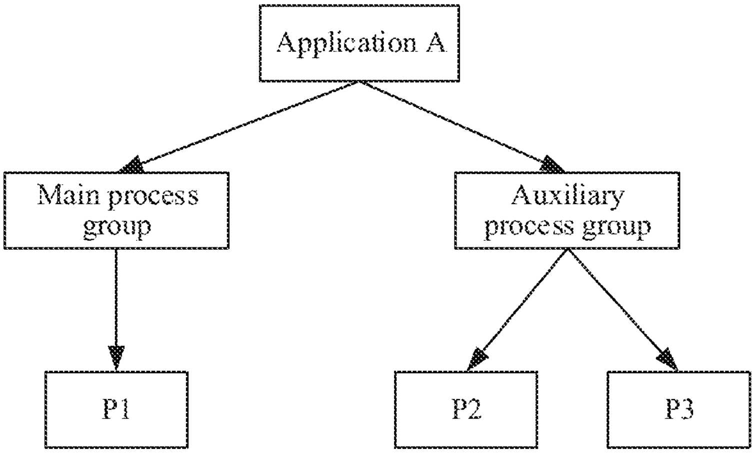
FIG. 5 is a schematic diagram of a process group of an application according to an embodiment of this application.

In addition, in this embodiment of this application, when processes of an application are managed, as shown in FIG. 5, the processes of the application may be divided into at least two groups. The process P1 supporting display of the user interface of the application A may be classified as a main process group, and the processes P2 and P3 supporting other functions of the application A may be classified as an auxiliary process group.

The electronic device may set the following.

When the memory pressure is high, processes in the main process group and processes in the auxiliary process group may be compressed according to different compression ratios. Anonymous pages of the processes in the main process group are compressed at a relatively large compression ratio (for example, 90%) and anonymous pages of the processes in the auxiliary process group are compressed at a relatively small compression ratio (for example, 20%). After anonymous pages of a process are compressed according to a certain ratio, compressed memory data of the process and uncompressed memory data of the process exist in the memory. For example, if 100M memory data of a process J1 is compressed at the compression ratio of 90%, 100M*90%=90M may be compressed into 30M at a compression rate of 1/3, and 100M*10%=10M is not compressed, to obtain 30M compressed memory data and 10M uncompressed memory data of the process J1. Therefore, there are the compressed memory data and the uncompressed memory data in the memory. When the memory needs to be cleaned, only the anonymous pages of the processes in the auxiliary process group, including the compressed memory data and the uncompressed memory data, are cleaned, and the anonymous pages of the processes in the main process group are not cleaned.

Because the processes in the main process group are generally relatively important processes such as processes used for displaying the user interface and processes that need to run continuously, compressing the processes at a relatively large ratio can reduce the occupied memory without cleaning the processes, and the processes may be restored quickly when needed. The processes in the auxiliary process group are generally processes that provide auxiliary functions. Compressing the processes at a relatively low ratio may save computing resources. If the memory pressure is high, cleaning the data of the processes does not have an important impact on the application.

Figure 6:
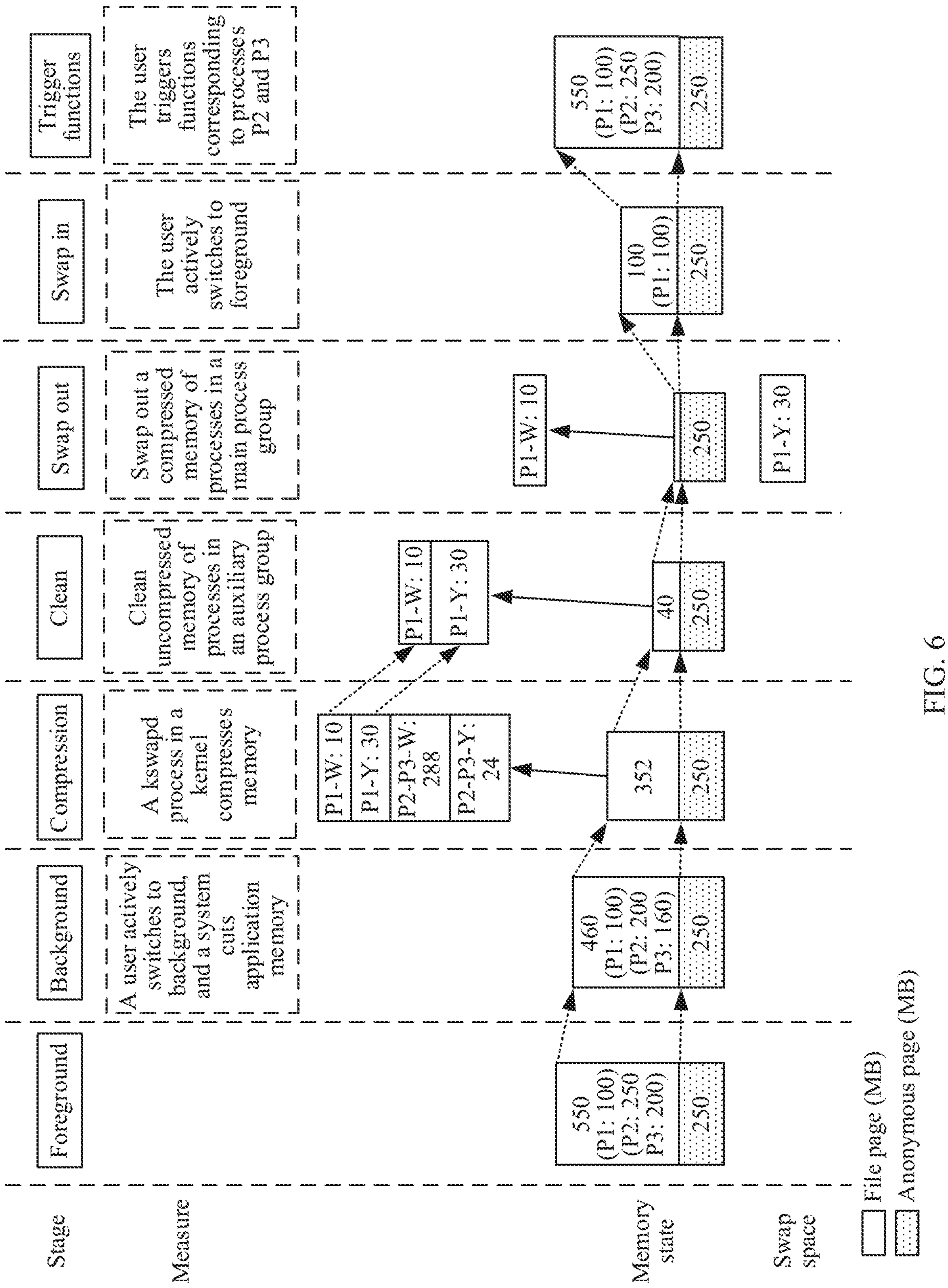
FIG. 6 is an exemplary schematic diagram of a memory state after memory management is performed on an application A at each stage according to an embodiment of this application.

For example, a memory management mode in this embodiment of this application is exemplarily described by using an example in which memory management is performed on an application A at each stage. FIG. 6 is an exemplary schematic diagram of a memory state after memory management is performed on an application A at each stage according to an embodiment of this application.

A running process of the application A for a period of time is divided into seven stages: foreground, background, compression, clean, swap out, swap in (hot start), and a trigger function.

At the foreground stage, when a user wants to open the application A, the application A starts three processes: P1, P2, and P3. The electronic device determines, according to a stored application and main process correspondence table, that the process P1 is a main process among the three processes started by the application A. By using two-level grouping, the process P1 is divided into a main process group of the application A, and the other two processes P2 and P3 are divided into an auxiliary process group of the application A.

The processes may be grouped in a plurality of manners.

For example, the division of the group may be implemented by storing a group relationship table in the memory. For example, as shown in Table 1 below, this is an example of a group relationship of the stored application A:

TABLE 1

| Application name | Processes in a main process group | Processes in an auxiliary process group |
|---|---|---|
| Application A | P1 | P2 and P3 |

In another example, the division of the group may be implemented by storing a branch tree as shown in FIG. 5.

In another example, the division of the group may be implemented by storing a correspondence. The correspondence may be expressed in a plurality of manners such as a function and an array, which are not limited herein. For example, a correspondence between the process P1 included in the main process group and the processes P2 and P3 included in the auxiliary process group in the application A may be represented in a form of [application A, P1, P2 P3].

There may also be many other manners to implement the division of the process groups, which are not limited herein.

Anonymous pages of the three processes P1, P2, and P3 respectively occupy memory spaces of 100M, 250M, and 200M in the memory, the process P1 in the main process group occupies 100M, the P2 and P2 in the auxiliary process group occupy 450M, and the anonymous pages of the application A occupy a total memory space of 550M. After the application A is started, related files may further be cached into a memory. It may be assumed that the application caches 250M data into the memory, so that file pages of the application A occupy a memory space of 250M. The application A occupies a total memory space of 800M.

Because a memory space of the file pages in the memory is reclaimed in an inherent rule, for ease of description, the memory space occupied by the file pages of the application A in this process is set not to change in this embodiment of this application.

At the background stage, after the user has used the application A for a period of time, and if the user wants to use another application such as an application B, the user opens the application B. In this case, the application A is switched from running in foreground to running in background. Because it is no longer necessary to display some content in real time during running in the background, the electronic device may cut some data that is unavailable in the application A in this case in the memory. For example, 50M unnecessary data of the process P2 of the application A in the memory may be cut, and 40M unnecessary data of the process P3 in the memory may be cut. In this case, the memory spaces occupied by the processes P1, P2, and P3 of the application A are 100M, 200M, and 160M respectively. The process P1 in the main process group occupies 100M, and the processes P2 and P3 in the auxiliary process group occupy 360M, which occupy a total memory space of 460M.

At the compression stage, if the user opens another application, which occupies more memory, the memory pressure of the electronic device is increased. When an occupied ratio of the total memory space exceeds a preset threshold A, the electronic device compresses data of an application that is not in the foreground in the memory.

The 100M data of the process P1 in the main process group is compressed at a compression ratio of 90%, 100M*90%=90M data is compressed into 30M compressed memory data P1-Y at a compression rate of 1/3, and put the compressed memory data into the compressed memory space in the memory. 100*10%=10M uncompressed data P1-W is remained.

The 360M data of the processes P2 and P3 in the auxiliary process group is compressed at a compression ratio of 20%. 360M*20%-72M data is compressed into 24M compressed memory data P2-P3-Y at the compression rate of 1/3, and put the compressed memory data into the compressed memory space in the memory. 360M*80%=288M uncompressed data P2-P3-W is remained.

In this case, a total memory space occupied by the application A in the memory is 10M (P1-W)+30M (P1-Y)+288M (P2-P3-W)+24M (P2-P3-Y)=352M.

At the clean stage, when the memory pressure further increases, the electronic device cleans all the data of the processes in the auxiliary process group in the memory, that is, the 281M uncompressed data P2-P3-W of the processes P2 and P3 and the 24M compressed data P2-P3-Y of the processes P2 and P3 in the auxiliary process group of the application A may be cleaned. The remaining memory data of the application A in the memory is P1-W, that is, 10M; and P1-Y, that is, 30M, which are a total of 40M.

At the swap out stage, if the user continues to open another new application, which occupies more memory, the memory pressure continues to increase. The electronic device may swap out a part of data in the compressed memory space of the memory to the swap space of the storage device. Therefore, the electronic device swaps out the 30M data (P1-Y: 30M) of the application A in the compressed memory space to a swap space. In this case, the space occupied by the anonymous pages of the application A in the memory is 10M. An occupied space in the swap space of the storage device is 30M.

In some embodiments, when a data in the compressed memory space is swapped out to the swap space, the data may also be compressed again. For example, the 30M data in the compressed memory space may be compressed into 10M data again and stored in the swap space. In this case, an occupied space of the anonymous pages of the application A in the swap space of the storage device is 10M.

At the swap in stage, if the user wants to use the application A again in this case, the user actively switches the application A to the foreground. The electronic device reads all the dumped anonymous pages of 30M data of the application A from the swap space and decompresses the anonymous pages into the memory. In this case, the data of the process P1 in the main process group of the application A is completely restored, which is 100M.

Generally, the main process in the main process group is a process related to an application startup interface. Therefore, after the data of the main process P1 is completely restored in the memory, the user interface of the application A may be normally displayed by using the data. For example, if the application A is a shopping application with a name of gouwus, and the application includes three processes after startup: com.gouwus.gouwus (P1), com.gouwus.gouwus: sandboxed_privilege_process (P2), and com.gouwus.gouwus:channel (P3). com.gouwus-.gouwus is a main process of the shopping application gouwus, and is used for displaying a main interface of the shopping application gouwus. After all the data of the process in the memory is restored, the user interface of the shopping application gouwus may be displayed normally.

It may be understood that a main interface of an application belongs to a user interface of the application. In some embodiments, the main interface of the application may also be referred to as the user interface of the application, which is not limited herein.

At the function trigger stage, if the user clicks a user interface of the application A, functions supported by the processes P2 and P3 are triggered, and the electronic device may read files of the application A in the memory, and regenerate 250M data of the process P2 and 200M data of the process P3 in the memory, which occupy 450M of the memory. In this case, an occupied capacity of the three processes of the application A in the memory is restored to 550M.

In this embodiment of this application, when the application A is swapped out to the swap space, only 30M anonymous page data needs to be written into the swap space. When the application A is hot started and is switched to the foreground, only 30M data needs to be read from the swap space, the data of the process P1 in the main process group may be restored in the memory, and the user interface of the application A is displayed. In this way, on one hand, the data read and written in the swap space is greatly reduced, and the service life of the storage device is improved. On the other hand, when 30M data is read, there is a delay of only 30 ms, which greatly reduces the delay of hot start of the application A and improves the hot start speed of the application A.

Figure 7:
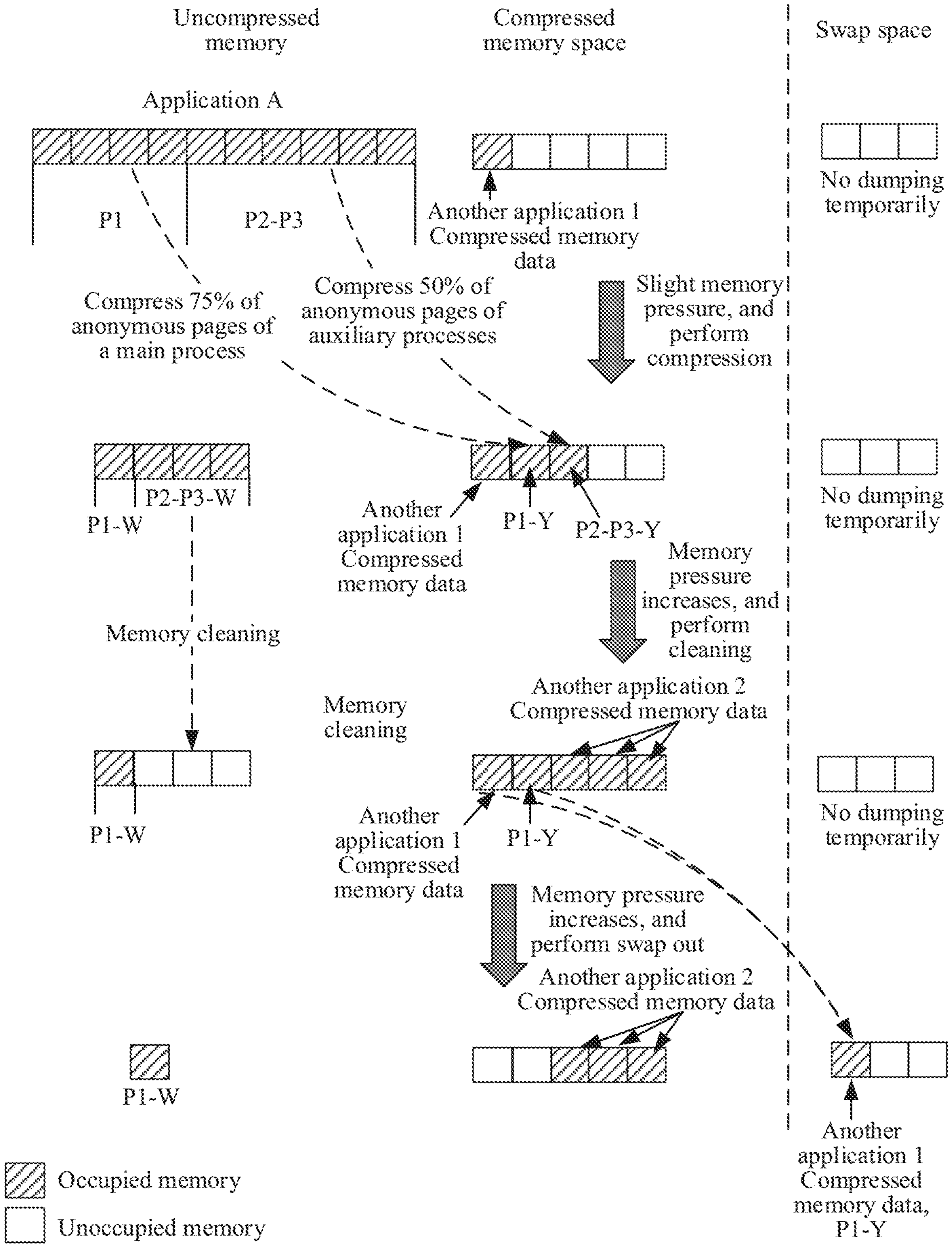
FIG. 7 is a schematic diagram of a memory data change according to an embodiment of this application.

For ease of understanding, the processing processes of the compression stage, the clean stage, and the swap out stage are further described exemplarily in combination with a schematic diagram of a data change shown in FIG. 7.

It is assumed that the data of the application A in the memory includes the data of the process P1 in the main process group and the data of the processes P2 and P3 in the auxiliary process group. In this case, the compressed memory space in the memory may store compressed memory data of another application 1, and there is temporarily no data dumped from the memory in the swap space of the storage device.

Under slight memory pressure, the electronic device compresses the data in the memory. According to the manner of compressing the process in the main process group at a high compression ratio and compressing the process in the auxiliary process group at a low compression ratio, 75% of the data in the anonymous pages of the main process P1 and 50% of the data in the anonymous pages of the auxiliary processes P2 and P3 may be compressed. In this case, the data of the application A in the memory includes uncompressed memory data and data in the compressed memory space (for example, ZRAM). The uncompressed memory data includes: the uncompressed memory data P1-W of the process P1 in the main process group; and the uncompressed memory data P2-P3-W of the processes P2 and P3 in the auxiliary process group. The data in the compressed memory space includes: the compressed memory data P1-Y of the process P1 in the main process group; and the compressed memory data P2-P3-Y of the processes P2 and P3 in the auxiliary process group. A space capacity occupied by the application A in the memory is reduced.

With the increase of memory pressure, the electronic device cleans all the data of the processes in the auxiliary process group in the memory, that is, P2-P3-W and P2-P3-Y are cleaned. In this case, a space occupied by the uncompressed memory data of the application A in the memory is further reduced.

When the memory pressure is increased, if memory data of another application 2 is compressed into the compressed memory space, and when the space occupation of the compressed memory space exceeds the preset threshold B, the electronic device may swap a part of the data in the compressed memory space into the swap space.

For example, as shown in FIG. 7, both the compressed memory data of another application 1 and P1-Y may be swapped into the swap space for storage. When the data in the compressed memory space is swapped into the swap space for storage, the memory data may be compressed again.

In some embodiments, there may be no compressed memory space in the memory, so that the electronic device may not perform the compression process in the memory, but directly clean all the data of the processes in the auxiliary process group in the memory.

In some embodiments, when the data in the memory is swapped into the swap space, the data may or may not be compressed, which is not limited herein.

In the foregoing embodiments, after the application A is started, the electronic device may determine, according to the prestored application and main process correspondence table, that among the three processes started by the application A, the process P1 is the main process, which is divided into the main process group of the application A, and the other two processes P2 and P3 are divided into the auxiliary process group of the application A.

Generally, a main process of an application is a process related to a main interface of the application.

For example, a music playing application Bofang includes three processes: com.bofang.bofang (a main process P1), which may be used for displaying a main interface of music playing; com.bofang.bofan:f (an auxiliary process P2), which may be used for playing music; and com.bofang.bofan:z, which may be used for loading data of next music in a playing list in advance.

In another example, a sports application yundong includes three processes: com.yundong.yundong (a main process P1), which may be used for displaying a main interface of the sports application: com.yundong.yundong:j (an auxiliary process P2), which may be used for continuously obtaining step count data of a sensor; and com.yundong.yundong:g (an auxiliary process P3), which may be used for obtaining step ranking information of a user.

It should be noted that, the electronic device may divide processes of each application into a plurality of process groups belonging to the application, which include a main process group and an auxiliary process group. That is, an application has a main process group and an auxiliary process group that belong to the application. For example, an application A has a main process group A1 and an auxiliary process group A2 of the application A, and an application B has a main process group B1 and an auxiliary process group B2 of the application B. A correspondence between the application and processes in the process groups of the application may be stored in the memory, and the correspondence may be stored in the form of a group relationship table, or in the form of a function, an array, or the like, which is not limited herein.

It may be understood that a main process of an application is generally divided into a main process group of the application, but there is not necessarily only the main process of the application in the main process group of the application. For example, when a process in the auxiliary process group meets a specific condition, the process may be adjusted from the auxiliary process group to the main process group. In this case, the main process group of the application includes not only the main process of the application, but also another process of the application.

In some embodiments of this application, the main process group may also be referred to as a first process group, and the auxiliary process group may also be referred to as a second process group, which is not limited herein.

Figure 8:
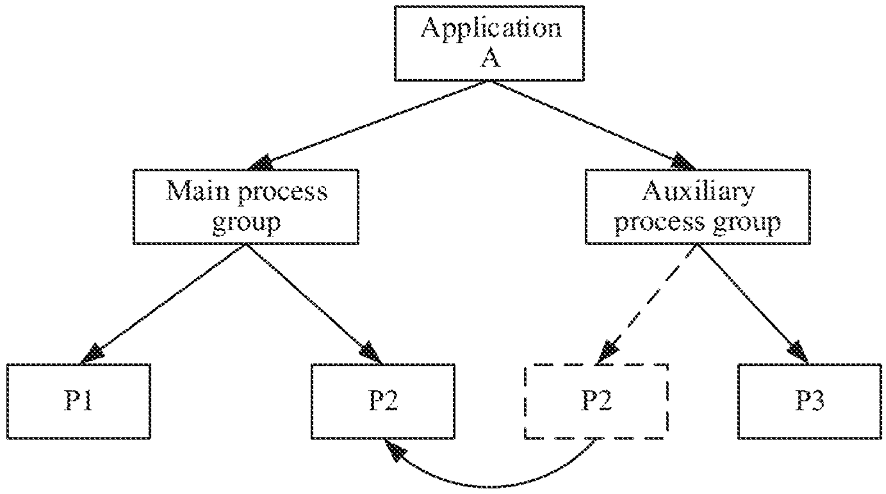
FIG. 8 is a schematic diagram of adjustment of a process group of an application according to an embodiment of this application.

In some embodiments, during running of the application A, the electronic device may sense a state of each process in the started application in real time, and adjust a process in the auxiliary process group to the main process group when the process meets a preset first condition. For example, as shown in FIG. 8, if the electronic device determines that the process P2 in the auxiliary process group of the application A continuously obtains data of a step count sensor, it indicates that the process P2 has a requirement for continuous operation, and the electronic device may adjust the process P2 of the application A from the auxiliary process group of the application A to the main process group.

For example, the division of the group may be implemented by storing a group relationship table in the memory. As shown in Table 2 below, this is an example of a group relationship of the stored application A:

TABLE 2

| Application name | Processes in a main process group | Processes in an auxiliary process group |
|---|---|---|
| Application A | P1 and P2 | P3 |

In another example, the division of the group may be implemented by storing a branch tree as shown in FIG. 8. This is not limited herein.

It may be understood that in some embodiments, when a process in the main process group meets a preset second condition, the electronic device may also adjust the process to the auxiliary process group, which is not limited herein.

The electronic device may perform different operations by grouping and adjusting processes of an application at different times. Several cases are exemplarily described below in combination with a scenario shown in FIG. 6.

As shown in FIG. 6, at the compression stage, the electronic device compresses the data of the process P1 in the main process group and the processes P2 and P3 in the auxiliary process group of the application A in the memory to obtain the uncompressed data P1-W of the process P1, the compressed data P1-Y of the process P1, the uncompressed data P2-P3-W of the processes P2 and P3 (including the uncompressed data P2-W of the process P2 and the uncompressed data P3-W of the process P3), and the compressed data P2-P3-Y of the processes P2 and P3 (including the compressed data P2-Y of the process P2 and the compressed data P3-Y of the process P3).

Figure 9A:
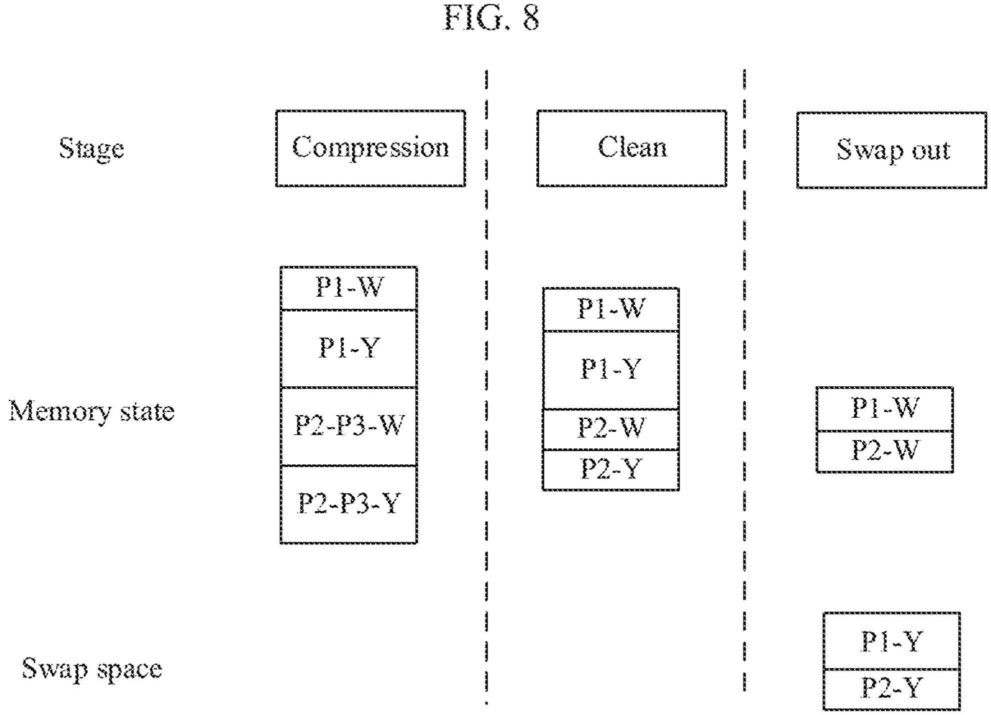
FIG. 9*a* is another exemplary schematic diagram of a memory state after memory management is performed on an application A at each stage according to an embodiment of this application.

For example, as shown in FIG. 9*a*, at the clean stage, after the electronic device has cleaned all the data of the processes P2 and P3 in the auxiliary process group of the application A in the memory for one or more times, if the memory of the electronic device continues to be shortage, and the electronic device detects that the data of the process P2 of the application A has not been cleaned (for example, the application A is the music playing application bofang, and the process P2 is the process com.bofang.bofan:f used for playing music), the electronic device may adjust the process P2 to the main process group of the application A in this case. In this way, at the swap out stage, the electronic device may swap out the compressed parts of the process P1 and the process P2 in the main process group of the application A to the swap space of the storage device.

Figure 9B:
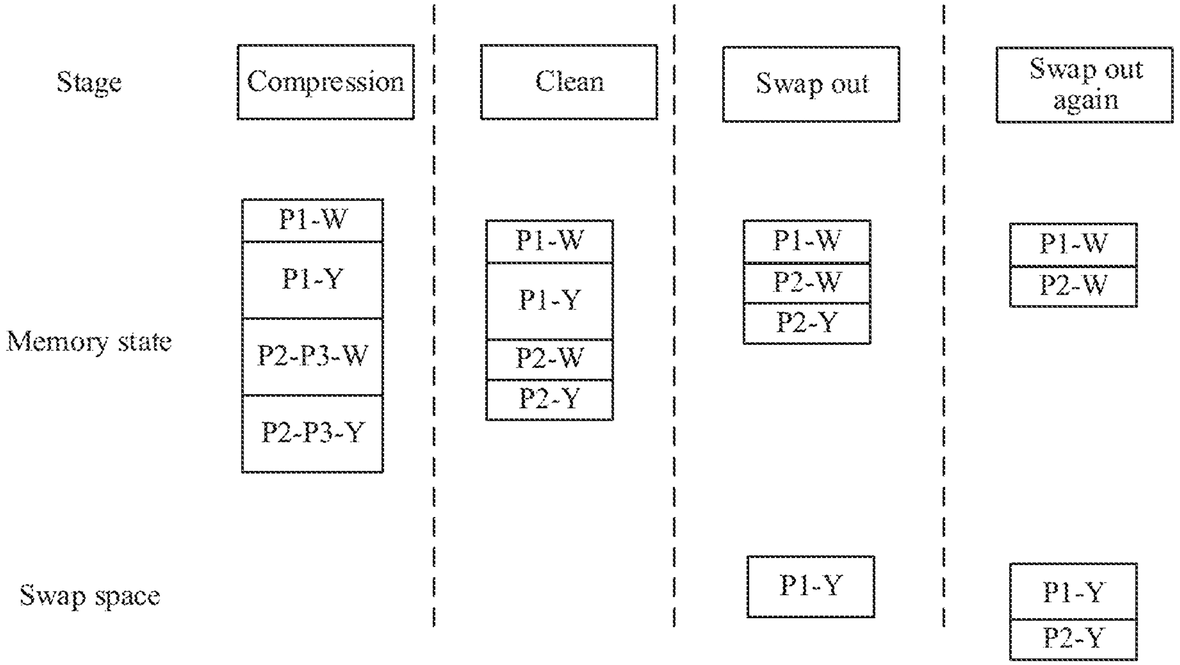
FIG. 9*b* is another exemplary schematic diagram of a memory state after memory management is performed on an application A at each stage according to an embodiment of this application.

For example, as shown in FIG. 9*b*, at the clean stage, the electronic device has cleaned all the data of the processes P2 and P3 in the auxiliary process group of the application A in the memory for one or more times. At the swap out stage, the electronic device may swap out the compressed data P1-Y of the process P1 in the main process group of the application A to the swap space of the storage device. If the memory of the electronic device continues to be shortage, and the electronic device detects that the data of the process P2 of the application A is still in the memory and has not been cleaned (for example, the application A is the sports application yundong, and the process P2 is the process com.yundong.yundong.j used for continuously obtaining the step count data of the sensor), the electronic device may adjust the process P2 to the main process group of the application A in this case and swap out the compressed memory data P2-Y of the process P2 to the swap space of the storage device.

It may be understood that the electronic device may also group and adjust the processes in the main process group or the auxiliary process group of the application at other memory management stages, and perform corresponding memory management after the grouping and adjusting, which is not limited herein.

First, an exemplary electronic device 100 provided in the embodiments of this application is described below.

Figure 10:
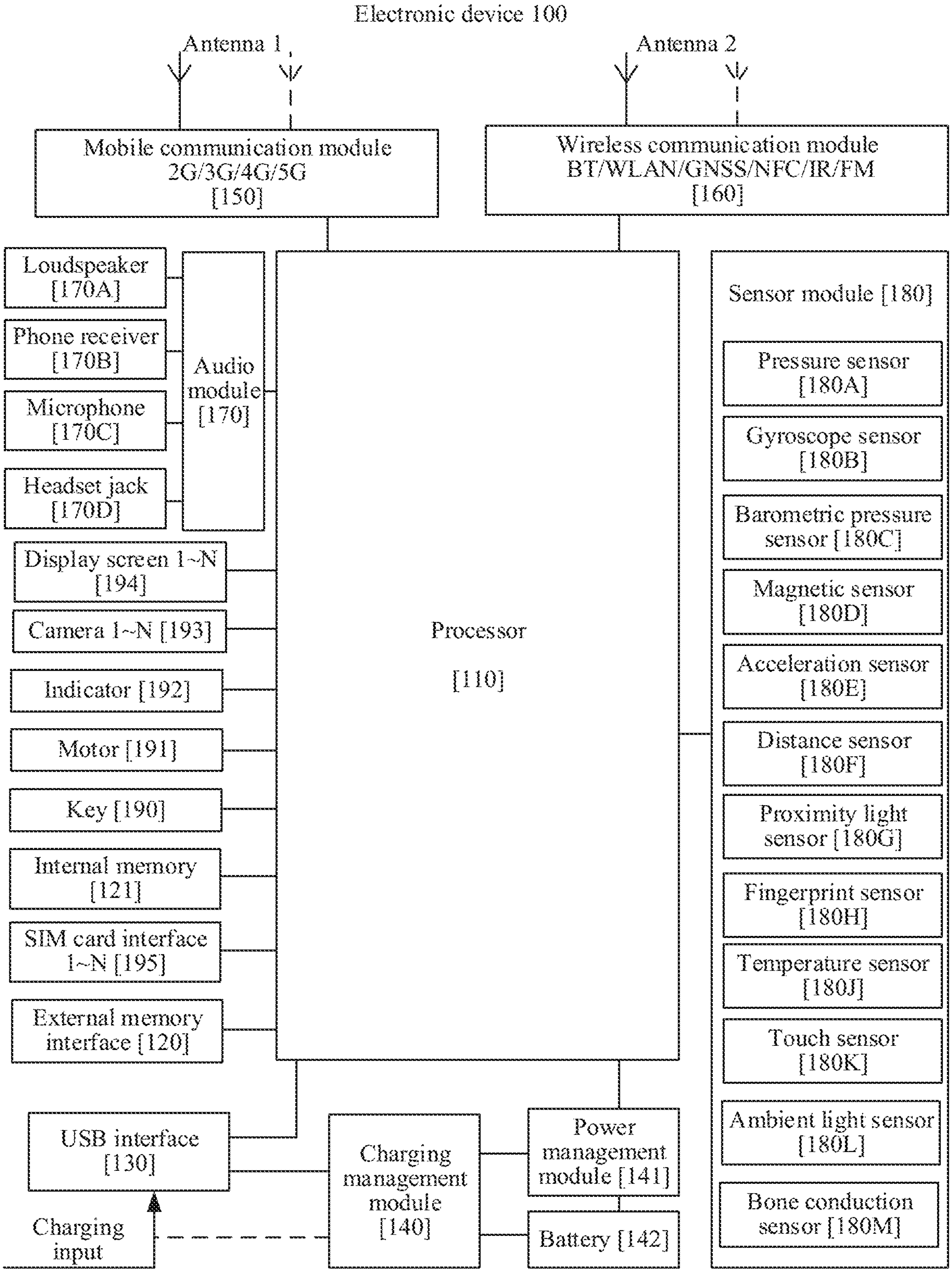
FIG. 10 is a schematic diagram of an exemplary hardware structure of an electronic device 100 according to an embodiment of this application.

FIG. 10 is a schematic structural diagram of an electronic device 100 according to an embodiment of this application.

This embodiment is described in detail below by using the electronic device 100 as an example. It should be understood that the electronic device 100 may have more or fewer components than those shown in the figure, may combine two or more components, or may have a different component configuration. The components shown in the figure may be implemented in hardware, software, or a combination of hardware and software that includes one or more signal processing and/or application-specific integrated circuits.

The electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H a temperature sensor 180J, and a touch sensor 180K, an ambient light sensor 180L, a bone conduction sensor 180M, and the like.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors.

The controller may be a nerve center and a command center of the electronic device 100. The controller may generate an operation control signal based on an instruction operation code and a timing signal, and read an instruction and control execution of the instruction.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIP1), a general-purpose input/output (general-purpose input/output, GPIO) interface, a subscriber identity module (subscriber identity module, SIM) interface, and/or a universal serial bus (universal serial bus, USB) interface.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIP1 interface may be configured to connect the processor 110 to a peripheral device such as the display screen 194 or the camera 193. The MIP1 interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device 100. The processor 110 communicates with the display screen 194 by using a DSI interface, to implement a display function of the electronic device 100.

The GPIO interface may be configured by using software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, and the like. The GPIO interface may alternatively be configured as an I2C interface, an I2S interface, a UART interface, a MIP1 interface, or the like.

The SIM interface may be configured to communicate with the SIM card interface 195, to implement a function of transferring data to an SIM card or reading data in an SIM card.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

It may be understood that a schematic interface connection relationship between the modules in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger or may be a wired charger.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in the same device.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The AP outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide a solution for wireless communication solution including a wireless local area network (wireless local area network, WLAN) (such as a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 100. The wireless communication module 160 may be one or more components into which at least one communication processing module is integrated. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, in the electronic device 100, the antenna 1 is coupled to the mobile communication module 150, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS) and/or satellite-based augmentation systems (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculations and to render graphics. The processor 110 may include one or more GPUs, and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 100 may include one or N display screens 194, and N is a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photo taking, a shutter is opened, a ray of light is transmitted to a light-sensitive element of the camera through a lens, an optical signal is converted into an electrical signal, and the light-sensitive element of the camera transmits the electrical signal to the ISP for processing, and the ISP converts the electrical signal into an image that can be seen. The ISP may also optimize noise point, brightness, and skin tone algorithms. The ISP may also optimize parameters such as exposure and color temperature of a shooting scene. In some embodiments, the ISP may be disposed in the camera 193.

The camera 193 is configured to capture a static image or a video. An optical image of an object is generated through a lens and is projected to the photosensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, and N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 100, for example, image recognition, facial recognition, voice recognition, and text understanding.

The internal memory 121 may include one or more random access memories (random access memories, RAMs) and one or more non-volatile memories (non-volatile memories, NVMs).

The random access memories may include a static-random access memory (static-random access memory, SRAM), a dynamic random access memory (dynamic random access memory, DRAM), a synchronous dynamic random access memory (synchronous dynamic random access memory, SDRAM), double data rate synchronous dynamic random access memory (double data rate synchronous dynamic random access memory, DDR SDRAM, for example, a fifth generation DDR SDRAM is generally referred to as DDR5 SDRAM), and the like.

The non-volatile memories may include a magnetic disk storage device and a flash memory.

The flash memory may be divided into NOR FLASH, NAND FLASH, 3D NAND FLASH, and the like according to an operation principle, or may be divided into a single-level cell (single-level cell, SLC), a multi-level cell (multi-level cell, MLC), a triple-level cell (triple-level cell, TLC), a quad-level cell (quad-level cell, QLC), and the like according to an electrical potential level of a storage unit, or may be divided into a universal flash storage (universal flash storage, UFS), an embedded multi media card, (embedded multi media card, eMMC), and the like according to a storage specification.

The random access memory may be directly read and written by the processor 110, may be configured to store executable programs (for example, machine instructions) of an operating system or other running programs, or may be configured to store data of users and applications.

The non-volatile memory may also store the executable programs, the data of the users and the applications, and the like, and may be loaded into the random access memory in advance for the processor 110 to perform direct reading and writing.

The external memory interface 120 may be configured to connect to an external non-volatile memory, to expand a storage capability of the electronic device 100. The external non-volatile memory communicates with the processor 110 by using the external memory interface 120, to implement a data storage function, for example storing a file such as a music or a video in the external non-volatile memory.

The electronic device 100 may implement an audio function by using the audio module 170, the loudspeaker 170A, the phone receiver 170B, the microphone 170C, the headset jack 170D, the application processor, and the like. For example, music playing, recording, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a “horn”, is configured to convert an audio electrical signal into a sound signal. Music can be listened to or a hands-free call can be answered by using the speaker 170A in the electronic device 100.

The telephone receiver 170B, also referred to as a “receiver”, is configured to convert an audio electrical signal into a sound signal. When the electronic device 100 is used to answer a call or receive voice information, the telephone receiver 170B may be put close to a human ear, to receive the voice information.

The microphone 170C, also referred to as a “microphone” or a “microphone”, is configured to convert a sound signal into an electrical signal. When making a call or sending voice information, a user may speak with the mouth approaching the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the touchscreen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When a force is applied to the pressure sensor 180A, the capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device 100. In some embodiments, an angular velocity of the electronic device 100 around three axes (i.e., x, y; and z axes) may be determined by using the gyroscope sensor 180B. The gyroscope sensor 180B may be used for image stabilization during photographing. For example, when the shutter is pressed, the gyro sensor 180B detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyro sensor 180B may also be used in navigation and a motion sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D may include a Hall effect sensor. The electronic device 100 may detect opening and closing and a flip cover leather case by using the magnetic sensor 180D. In some embodiments, when the electronic device 100 is a clamshell phone, the electronic device 100 may detect opening and closing of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect acceleration values of the electronic device 100 in all directions (generally in three axes). When the electronic device 100 is stationary, a magnitude and a direction of gravity may be detected. The acceleration sensor may be further configured to recognize a posture of the electronic device, and is applied to an application such as switching between landscape orientation and portrait orientation or a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The electronic device 100 may emit infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that a user holds the electronic device 100 close to an ear to make a call, to automatically turn off the screen for power saving. The optical proximity sensor 180G may alternatively be used in a leather case mode or a pocket mode to automatically unlock or lock the screen.

The ambient light sensor 180L is configured to sense luminance of ambient light. The electronic device 100 may adaptively adjust a luminance of the display screen 194 according to perceived brightness of the ambient light. The ambient light sensor 180L may be further configured to automatically adjust white balance during photo taking. The ambient light sensor 180L may further cooperate with the optical proximity sensor 180G to detect whether the electronic device 100 is in a pocket, so as to prevent an accidental touch.

The fingerprint sensor 180H is configured to collect a fingerprint. The electronic device 100 may implement fingerprint unlock, application lock accessing, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor located near the temperature sensor 180J, to reduce power consumption and implement thermal protection. In some other embodiments, when the temperature is below another threshold, the electronic device 100 heats the battery 142, to prevent the low temperature from causing the electronic device 100 to shut down abnormally. In some other embodiments, when the temperature is below still another threshold, the electronic device 100 boosts an output voltage of the battery 142 to prevent abnormal shutdown caused by the low temperature.

The touch sensor 180K is also referred to as a "touch panel". The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation by using the display screen 194. In some other embodiments, the touch sensor 180K may be alternatively disposed on a surface of the electronic device 100, and is located on a position different from that of the display screen 194.

The key 190 includes a power key, a volume key, and the like. The key 190 may be a mechanical key, or a touch-type key. The electronic device 100 may receive a key input, and generate a key signal input related to user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces. N is a positive integer greater than 1. The SIM card interface 195 can support a nano SIM card, a micro SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The electronic device 100 interacts with a network by using a SIM card, to implement functions such as a call and data communication.

In some embodiments of this application, the non-volatile memory in the internal memory 121 may be referred to as a memory. The random access memory in the internal memory 121 is referred to as a storage device.

In some embodiments of this application, the memory may include a compressed memory space used for storing compressed memory data.

In some embodiments of this application, the non-volatile memory in the internal memory 121 may include a swap space used for expand a capacity of the random access memory in the internal memory 121.

In this embodiment of this application, the processor 110 causes the electronic device 100 to perform the virtual memory management method in the embodiments of this application by invoking computer instructions stored in the internal memory 121.

Figure 11:
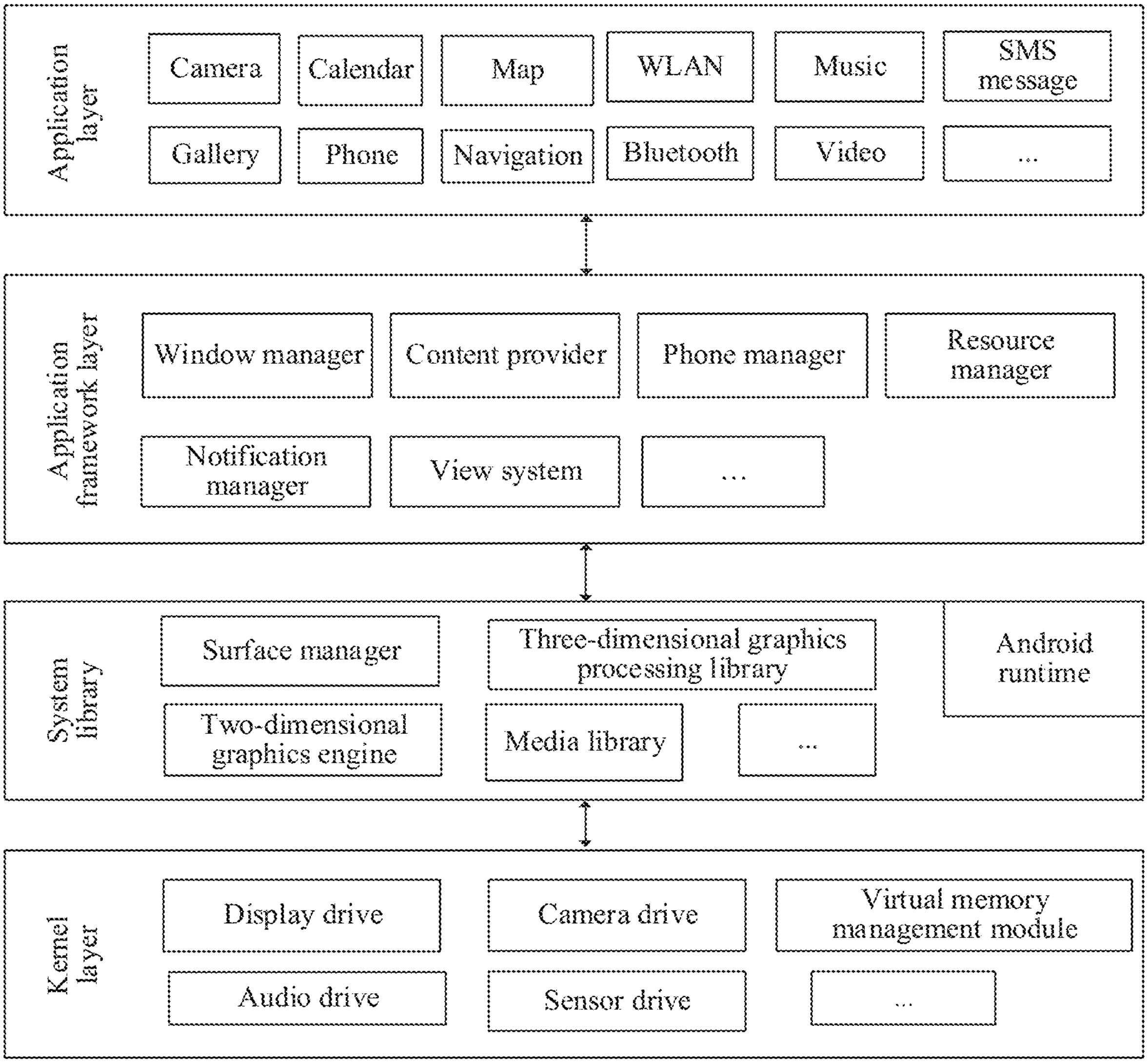
FIG. 11 is a schematic diagram of an exemplary software architecture of an electronic device 100 according to an exemplary embodiment of this application.

FIG. 11 is a block diagram of a software structure of an electronic device 100 according to an embodiment of this application.

In a layered architecture, software is divided into several layers, and each layer has a clear role and task. Layers communicate with each other through a software interface. In some embodiments, the system is divided into four layers that are respectively an application layer, an application framework layer, a runtime and system library and a kernel layer from top to bottom.

The application layer may include a series of application packages.

As shown in FIG. 11, the application packages may include applications such as camera, photos, calendar, phone, maps, navigation, WLAN. Bluetooth, music, videos, and SMS messages.

The application framework layer provides an application programming interface (application programming interface, API) and a programming framework for the applications at the application layer. The application framework layer includes some predefined functions.

As shown in FIG. 11, the application framework layer may include a window manager, a content provider, a view system, a phone manager, a resource manager, a notification manager, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, an audio, calls made and answered, a browsing history and bookmarks, an address book, and the like.

The view system includes a visual control such as a control for text display or a control for picture display. The view system may be configured to construct an application. A display interface may be formed by one or more views. For example, a display interface including an SMS notification icon may include a view for displaying text and a view for displaying a picture.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog interface. For example, text information is prompted on a status bar, a prompt tone is made, the electronic device vibrates, or an indicator light flashes.

The runtime includes a core library and a virtual machine. The runtime is responsible for scheduling and managing the Android system.

The core library includes two parts: One part is a performance function that the programming language (for example, Java language) needs to invoke, and the other part is a core library of the system.

The application layer and the application framework layer run on the virtual machine. The virtual machine executes programming files (for example, jave files) of the application layer and the application framework layer as binary files. The virtual machine is used to execute functions such as object lifecycle management, stack management, thread management, security and exception management, and garbage collection.

The system library may include a plurality of function modules, such as a surface manager (surface manager), a media library (media libraries), a three-dimensional graphics processing library (for example, OpenGL ES), and a 2D graphics engine (for example, SGL).

The surface manager is configured to manage a display subsystem, and provide fusion of two dimensional (2-Dimensional, 2D) and three-dimensional (3-Dimensional, 3D) layers to a plurality of applications.

The media library supports playback and recording of a plurality of common audio and video formats, a static image file, and the like. The media library may support a plurality of audio and video encoding formats, for example, MPEG 4, H.264, MP3, AAC, AMR, JPG, and PNG.

The three-dimensional graphics processing library is used to implement 3D graphics drawing, image rendering, composition, layer processing, and the like.

The 2D graphics engine is a drawing engine for 2D drawings.

The kernel layer is a layer between hardware and software. The kernel layer includes at least a display drive, a camera drive, an audio drive, a sensor drive, and a virtual card drive.

The following illustrates working processes of software and hardware of the electronic device 100 with reference to an image capturing or photographing scenario.

When the touch sensor 180K receives a touch operation, a corresponding hardware interrupt is sent to the kernel layer. The kernel layer processes the touch operation into an original input event (including information such as coordinates of a touch and a time stamp of the touch operation). The original input event is stored at the kernel layer. The application framework layer obtains the original input event from the kernel layer, and recognizes a control corresponding to the input event. Using an example in which the touch operation is a touch/click operation, and a control corresponding to the click operation is a control of a camera application icon. The camera application invokes an interface of the application framework layer to start a camera application, then starts a camera driver by invoking the kernel layer, and captures a static image or a video by using the camera 193.

In this embodiment of this application, the application framework layer, the system library, or the kernel layer may include a virtual memory management module. The virtual memory management module may be configured to perform the virtual memory management method in the embodiments of this application.

Figure 12:
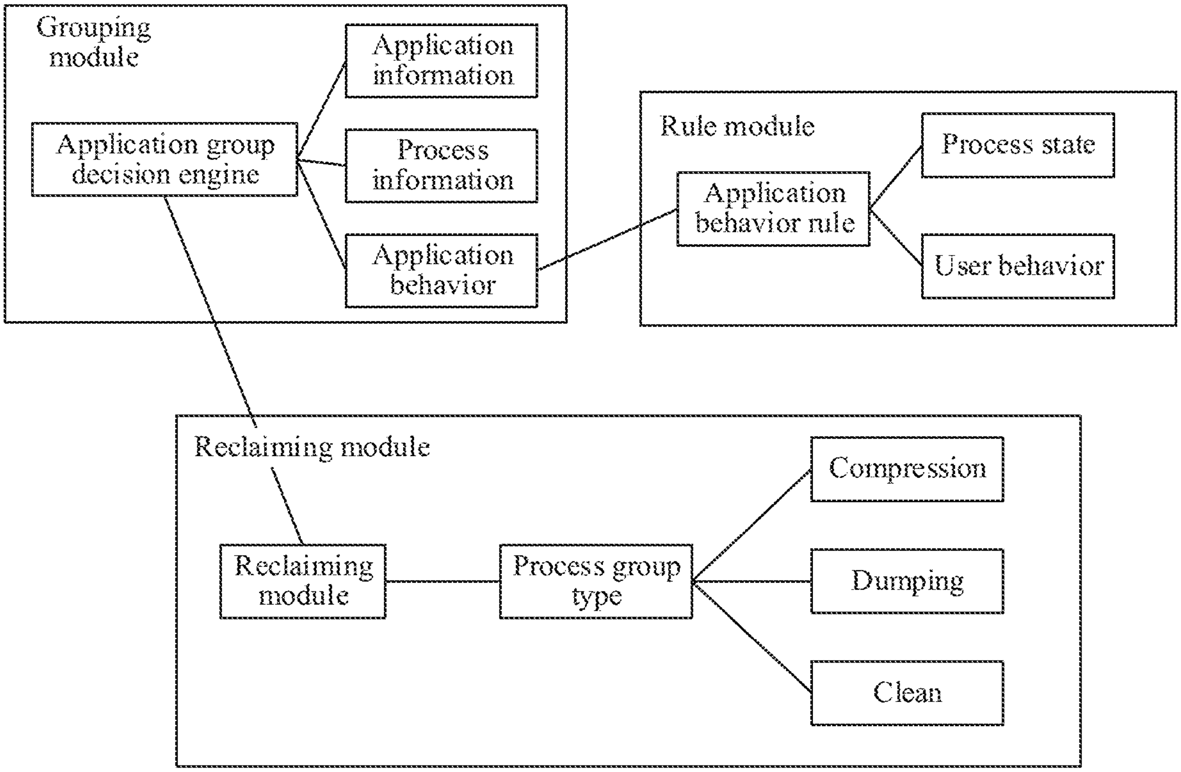
FIG. 12 is an exemplary schematic structural diagram of a virtual memory management module according to an embodiment of this application.

In some embodiments, as shown in FIG. 12, the virtual memory management module may specifically include the following.

A grouping module is configured to divide processes of each application into a main process group and an auxiliary process group according to application information (for example, a packet name of an application and an application type) and process information (for example, a name of a process and a process type) by an application grouping decision engine, and adjust a process in the auxiliary process group to the main process group or adjust a process in the main process group to the auxiliary process group according to an application behavior (for example, continuously accessing a sensor to obtain data) and an application behavior rule in a rule module (for example, a frequency of accessing data of a sensor reaches a preset frequency value).

A rule module is configured to store a rule of process group switching of each application, which may also be referred to as an application behavior rule. The application behavior rule includes a rule of switching the process in the auxiliary process group to the main process group (for example, a preset first condition for adjusting a process in an auxiliary process group of an application A to a main process group) and a rule of switching the process in the main process group to the auxiliary process group (for example, a preset second condition for switching the process of the application A that has been switched to the main process group to the auxiliary process group). A process group switching rule of an application may be preset according to a process state and/or a user behavior. For example, a preset condition for switching a process of a map application 1 from an auxiliary process group to a main process group may be preset: a frequency at which the process accesses a positioning sensor exceeds a preset frequency threshold 1 and an operation frequency of a user in the map application 1 exceeds a preset frequency 2. It may be understood that some process group switching rules may alternatively be preset according to only the process state or according to only the user behavior, which is not limited herein.

A reclaiming module is configured to reclaim a memory in various manners according to different process group types (the main process group or the auxiliary process group) determined by the grouping module for the processes in the application, where the manners include: compressing memory data into a compressed memory space, dumping memory data or data in a compressed memory space to a swap space of a storage device, or cleaning memory data in the memory. Different policies may be used for different process group types during memory reclaiming. For example, when the memory data is compressed in the compressed memory space, memory data of a process in the main process group is compressed at a relatively high ratio, and memory data of a process in the auxiliary process group is compressed at a relatively low ratio. In another example, when the memory data in the memory is cleaned, only the memory data of the process in the auxiliary process group is cleaned but the memory data of the process in the main process group is not cleaned.

The following specifically describes the method in the embodiments of this application in combination with software and hardware structures of the electronic device 100.

Figure 13:
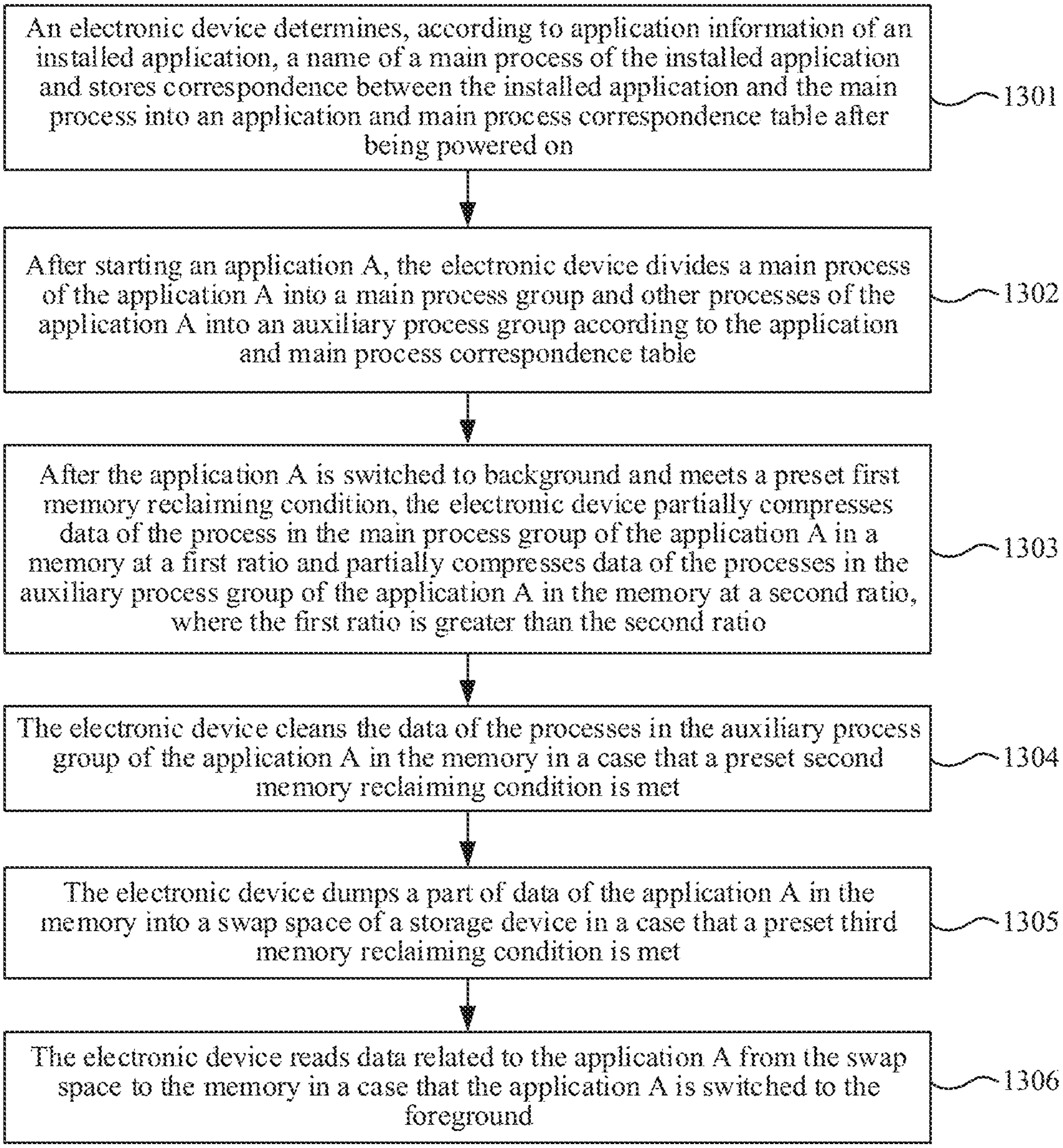
FIG. 13 is a schematic flowchart of a virtual memory management method according to an embodiment of this application.

FIG. 13 is a schematic flowchart of a virtual memory management method according to an embodiment of this application.

S1301. An electronic device determines, according to application information of an installed application, a name of a main process of the installed application and stores a correspondence between the installed application and the main process into an application and main process correspondence table after being powered on.

For most applications, names of main processes are recorded in application information. After being powered on, the electronic device may obtain an installation list of all applications in a system, obtain a name of a main process of an application by invoking a getApplicationInfo function of the application, and then maintain an application and main process correspondence table in the system.

For example, for an application A installed in the electronic device, the electronic device may determine a name of a main process thereof as P1 according to installation information, and store a correspondence between the application A and the process P1 in the application and main process correspondence table. Similarly, determined correspondences between other applications and main processes thereof are also stored in the application and main process correspondence table.

For example, Table 3 is an example of an application and main process correspondence table.

TABLE 3

| Application name | Name of a main process |
|---|---|
| Application A | P1 |
| Application B | M2 |
| Application C | K5 |

It may be understood that during actual application, for some applications, the electronic device cannot obtain main process information corresponding to the applications according to application information. In this case, correspondences between the applications and main processes may not be displayed in the application and main process correspondence table, or correspondences between the applications and main processes may be added to the application and main process correspondence table and the main processes of the applications may be set to a null value, which is not limited herein.

S1302. After starting an application A, the electronic device divides a main process of the application A into a main process group and other processes of the application A into an auxiliary process group according to the application and main process correspondence table.

For example, if the application and main process correspondence table is shown in Table 3, after the application A is started, two processes are started, which are a process P1 and a process P2, and the electronic device divides the process P1 to a main process group of the application A and divides the process P2 to the auxiliary process group of the application A.

For example, if the application and main process correspondence table is shown in Table 3, after the application A is started, three processes are started, which are a process P1, a process P2, and a process P3, and the electronic device divides the process P1 to the main process group of the application A and divides the process P2 and the process P3 to the auxiliary process group of the application A. In this case, a group relationship of the application A stored in the memory may be shown in Table 1.

For example, if the main process of the application A in the application and main process correspondence table is a null value, after the application A is started, three processes are started, which are a process P1, a process P2, and a process P3, and the electronic device divides the three processes P1, P2, and P3 into the auxiliary process group of the application A.

S1303. After the application A is switched to background and meets a preset first memory reclaiming condition, the electronic device partially compresses data of the process in the main process group of the application A in a memory at a first ratio and partially compresses data of the processes in the auxiliary process group of the application A in the memory at a second ratio, where the first ratio is greater than the second ratio.

Specifically, the first ratio is a ratio of compressed data to uncompressed data in the data of the process in the main process group of the application A.

The second ratio is a ratio of compressed data to uncompressed data in the data of the processes in the auxiliary process group of the application A.

The preset first memory reclaiming condition may be that a total memory space occupied rate exceeds a preset first occupied rate, or a memory occupied rate of an application exceeds a preset application first occupied rate, which is not limited herein.

For example, at the compression stage in the embodiment shown in FIG. 6, when the application A is switched to background and an occupied ratio of a total memory space exceeds the preset threshold A, the electronic device compresses the data of the process P1 in the main process group of the application A at the ratio of 90% and compresses the data of the processes P2 and P3 in the auxiliary process group of the application A at the ratio of 20%.

Optionally, in some embodiments, the memory may have no compressed memory space. In this case, step S1303 may not be performed.

S1304. The electronic device cleans the data of the processes in the auxiliary process group of the application A in the memory in a case that a preset second memory reclaiming condition is met.

In some embodiments, if the memory has a compressed memory space, after step S1303 is performed, step S1304 may be performed. In this case, when cleaning the data of the processes in the auxiliary process group of the application A, according to different settings, the electronic device may (1) clean only uncompressed data of the processes in the auxiliary process group of the application A in the memory but does not clean data of the processes in the auxiliary process group of the application A in the compressed memory space; or (2) may clean uncompressed data of the processes in the auxiliary process group of the application A in the memory and data of the processes in the auxiliary process group of the application A in the compressed memory space, which is not limited herein.

In some embodiments, if the memory has no compressed memory space, step S1303 may not be performed, and step S1304 may be directly performed. In this case, the electronic device may directly clean all the data of the processes in the auxiliary process group of the application A in the memory.

It may be understood that a requirement of the preset second memory reclaiming condition is higher than that of the preset first memory reclaiming condition. For example, if the preset first memory reclaiming condition is that a memory space occupied rate is higher than 50%, the preset second memory reclaiming condition may be that the memory space occupied rate is higher than 70%. In this case, it may be considered as that the preset second memory reclaiming condition is higher than the preset first memory reclaiming condition.

In some embodiments of this application, the preset first memory reclaiming condition may also be referred to as the preset second memory reclaiming condition, and the preset second memory reclaiming condition may also be referred to as the preset first memory reclaiming condition. In this case, the requirement of the preset second memory reclaiming condition is lower than that of the preset first memory reclaiming condition. For example, if the preset first memory reclaiming condition is that a memory space occupied rate is higher than 60%, the preset second memory reclaiming condition may be that the memory space occupied rate is higher than 40%. In this case, it may be considered as that the preset second memory reclaiming condition is lower than the preset first memory reclaiming condition.

S1305. The electronic device dumps a part of data of the application A in the memory into a swap space of a storage device in a case that a preset third memory reclaiming condition is met.

In some embodiments, if the memory has the compressed memory space, after step S1304 is performed, step S1305 may be performed. In this case, the electronic device may dump data of the application A in the compressed memory space into a swap space.

In some embodiments, if the memory has no compressed memory space, step S1303 may not be performed, and step S1304 may be directly performed. In this case, there is no data of the processes in the auxiliary process group of the application A in the memory. After step S1304 is performed, and when step S1305 is performed, the electronic device may dump the data in the main process group of the application A in the memory into the swap space according to a preset first dumping ratio. For example, the preset first dumping ratio may be 20%, 50%, 100%, or the like, which is not limited herein.

It may be understood that the preset third memory reclaiming condition is higher than the preset second memory reclaiming condition. For example, if the preset second memory reclaiming condition is that a memory space occupied rate is higher than 70%, the preset third memory reclaiming condition may be that the memory space occupied rate is higher than 90%. In this case, it may be considered as that the preset third memory reclaiming condition is higher than the preset second memory reclaiming condition.

S1306. The electronic device reads data related to the application A from the swap space to the memory in a case that the application A is switched to the foreground.

It may be understood that if data related to the application A in the swap space is compressed data, when the data is read to the memory, the data is decompressed.

For example, at the swap out stage in the embodiment shown in FIG. 6, when the user actively switches the application A to the foreground, the electronic device reads all the dumped anonymous pages of 30M data of the application A from the swap space and decompresses the anonymous page data into the memory. In this case, the data of the process P1 in the main process group of the application A is completely restored, which is 100M, and a user interface of the application A may be normally displayed.

In this embodiment of this application, the electronic device may divide processes of a started application into a main process group and an auxiliary process group of the application, and use different policies for memory management on the processes in the main process group and the auxiliary process group. For unimportant data of the processes in the auxiliary process group, a relatively low compression ratio is adopted, and the data is directly cleaned when the data needs to be cleaned. For important data of the process in the main process group, a relatively high compression ratio is adopted, and when the memory pressure is high, the data is dumped into the swap space, which ensures the integrity of the important process data. Because the unimportant data of the processes in the auxiliary process group is directly cleaned, the memory data to be compressed and the data to be dumped to the swap space are reduced. In this way, on one hand, the data read and written in the swap space is reduced, and the service life of the storage device is improved. In addition, only less data needs to be read to restore the data of the process in the main process group, which improves the hot start speed of the application.

In some embodiments of this application, the process P1 may also be referred to as a first process, the process P2 may also be referred to as a second process, and the process P3 may also be referred to as a third process. In some embodiments of this application, the process P1 may also be referred to as a first process, the process P2 may also be referred to as a third process, and the process P2 may also be referred to as a second process, which is not limited herein.

With reference to the embodiment shown in FIG. 13, in some embodiments, during running of the application A, the electronic device continuously senses process states of the processes started by the application A. When the electronic device determines that a process in the auxiliary process group of application A meets a preset first condition, the electronic device may adjust the process to the main process group of application A.

The preset first condition may be a correspondence between a preset process and a preset process state in a preset first state table.

It may be understood that the preset first condition may be configured by a developer according to an actual test and a requirement. That is, processes, process states, and correspondences included in the preset first state table may be configured by the developer according to the requirement.

For example, Table 4 is an example of a preset first state table.

TABLE 4

| Process name | Process state |
|---|---|
| Positioning process | Positioning state |
| Music playing process | Music playing state |

It may be understood that in some embodiments, in the preset first state table, processes and process states may include a one-to-one correspondence (one process name corresponds to one process state), or may include a one-to-many correspondence (one process name corresponds to a plurality of process states, and if the process meets any one of the process states, the process meets the preset first condition), or may include a many-to-one correspondence (a plurality of process names correspond to a process state, and if any one of the processes meets the process state, the process meets the preset first condition), which is not limited herein.

Generally, the preset processes in the preset first state table may be some processes such as a music playing process, a positioning process, and a step counting process that may maintain in a non-cleanable state. The preset process states in the preset first state table may be some process states that can be perceived by the user. For example, when the music playing process is in the music playing state, if the music playing process is cleaned, the user finds that the music is no longer playing, so that the user may perceive that the music playing process is cleaned. When the positioning process is in the positioning state, if the positioning process is cleaned, the user finds that geographic location information cannot be continuously obtained, so that the user may perceive that the positioning process is cleaned.

In some embodiments, when determining that memory data of a process cannot be cleaned, the electronic device may determine that a process state of the process meets the preset first condition. In some embodiments, alternatively, the electronic device may periodically determine whether a process state of each process meets the preset first state table, so as to determine whether the process state of each process meets the preset first condition, which is not limited herein.

With reference to the embodiment shown in FIG. 13, in some embodiments, during running of the application A, the electronic device continuously senses process states of the processes started by the application A. When the electronic device determines that a process in the main process group of the application A meets a preset second condition, the electronic device may adjust the process to the auxiliary process group of the application A.

The preset second condition may be a correspondence between a preset process and a preset process state in a preset second state table.

The preset second condition may be configured by a developer according to an actual test and a requirement. That is, processes, process states, and correspondences between the processes and the process states in the preset second state table may be configured by the developer according to the requirement.

For example, Table 5 is an example of a preset second state table.

TABLE 5

| Process name | Process state |
|---|---|
| Positioning process | No state |
| Music playing process | No state |

It may be understood that in some embodiments, in the preset second state table, processes and process states may include a one-to-one correspondence (one process name corresponds to one process state, and if the process meet the process state, the process meets the preset first condition), or may include a one-to-many correspondence (one process name corresponds to a plurality of process states, and if the process meets any one of the process states, the process meets the preset first condition), or may include a many-to-one correspondence (a plurality of process names correspond to a process state, and if any one of the processes meets the process state, the process meets the preset first condition), which is not limited herein.

Generally, the preset processes in the preset second state table may be some processes such as a music playing process, a positioning process, and a step counting process that may maintain in a cleanable state. The process states in the preset second state table may be some process states that cannot be perceived by the user. For example, when playing of music is stopped, a process state of the music playing process is no state. In this case, the music playing process is cleaned, the user does not find that the process is cleaned. When positioning is stopped, a process state of the positioning process is no state, and if the positioning process is cleaned, the user does not find that the process is cleaned.

It may be understood that during actual application, if there are more than two groups of processes, preset conditions for transferring processes in any group to other groups may be set to be different from each other, or preset conditions for transferring processes in some of the groups to a group may be set to be the same, or preset conditions for transferring processes in some of the groups to a group may be set to be different, which is not limited herein.

The electronic device may sense states of processes, dynamically adjust the processes to different process groups according to the states of the processes, and perform corresponding management, which improves the memory management efficiency.

The foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, and these modifications or replacements will not cause the essence of corresponding technical solutions to depart from the scope of the technical solutions in the embodiments of this application.

As used in the foregoing embodiments, based on the context, the term "when" may be interpreted as a meaning of "is", "after", "in response to determining . . . ", or "in response to detecting . . . ". Similarly, based on the context, the phrase "when determining" or "if detecting (a stated condition or event)" may be interpreted as a meaning of "if determining . . . ", "in response to determining . . . ", "when detecting (a stated condition or event)", or "in response to detecting . . . (a stated condition or event)".

All or some of the foregoing embodiments may be implemented by using software, hardware, firmware, or any combination thereof. When software is used for implementation, implementation may be entirely or partially performed in the form of a computer program product. The computer program product includes one or more computer instructions. When the computer program instruction is loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program runs, the procedures in the foregoing method embodiments may be performed. The foregoing storage medium includes: any medium that can store program code, such as a ROM, a random access memory RAM, a magnetic disk, or an optical disc.

What is claimed is:

1. A memory management method, applicable to an electronic device, the method comprising:

starting a first application that comprises a first process and a second process, wherein the first process is a process related to a main interface of the first application, and wherein a process name of the second process comprises a process name of the first process and a colon; and switching the first application to background and starting a second application, wherein after the first application is switched to the background and the second application is started, in response to the second process being an auxiliary process and the first process being a main process, the method further comprises compressing a first percentage of data of the first process and compressing a second percentage of data of the second process, wherein the first percentage is greater than the second percentage, and the second percentage is greater than zero, and wherein after compressing the data of the first process, the method further comprises:

starting a third application; and cleaning the second process and skipping cleaning the first process after the third application is started.

2. The memory management method of claim 1, wherein after the first application is switched to the background and the second application is started, memory of the electronic device occupied by the second application increases a memory pressure of the electronic device.

3. The memory management method of claim 2, wherein the data of the first process is compressed after switching the first application to the background and starting the second application.

4. The memory management method of claim 3, wherein the data of the first process is compressed in response to the increased memory pressure.

5. The memory management method of claim 3, wherein the data of the second process is compressed in response to the increased memory pressure.

6. The memory management method of claim 3, further comprising cleaning the second process and skipping cleaning the first process in response to a further increase to the memory pressure.

7. The memory management method of claim 1, further comprising:

starting a fourth application after the second process is cleaned; and dumping a part or all of the data of the first process into a swap space of a storage device of the electronic device after the fourth application is started.

8. The memory management method of claim 7, further comprising displaying an interface of the first application by using the data of the first process in the memory in response to an operation of switching the first application to foreground.

9. The memory management method of claim 8, further comprising:

reading data related to the first application from the swap space of the storage device and decompressing the data into the memory in response to the operation of switching the first application to the foreground, wherein the data related to the first application comprises the part or all of the data of the first process; and displaying the interface of the first application by using the data of the first process in the memory.

10. The memory management method of claim 1, wherein after switching the first application to the background and starting the second application, the method further comprises cutting the data of the first process.

11. The memory management method of claim 1, wherein after switching the first application to background and starting the second application, the method further comprises cutting the data of the second process.

12. The memory management method of claim 1, wherein the first application further comprises a third process, and after the starting a third application, the method further comprises:

cleaning the third process; and compressing the data of the third process after the third process is cleaned, and in a case that the third process is still run and data in the memory is not cleaned, wherein a percentage of the data of the third process subject to compression is the first percentage; and dumping a part or all of the data of the third process into a swap space of a storage device of the electronic device after the starting a fourth application.

13. The memory management method of claim 1, wherein the data of the first process is compressed at a first compression rate, the data of the second process is compressed at a preset second compression rate, and the first compression rate is the same as or different from the second compression rate.

14. The memory management method of claim 1, wherein the process name of the first process is based on application information of the first application, and wherein the method further comprises:

storing a correspondence between the first application and the first process; and dividing the first process into a first process group and another process of the first application into a second process group according to the correspondence between the first application and the first process in a case that the first application is run.

15. The memory management method of claim 14, further comprising:

adjusting, in a case that a fourth process in the second process group meets a preset first condition, the fourth process into the first process group, wherein the fourth process is any process in the second process group; and adjusting, in a case that a fifth process in the first process group meets a preset second condition, the fifth process into the second process group, wherein the fifth process is any process in the first process group.

16. An electronic device, comprising:

one or more processors; and one or more memories coupled to the one or more processors and configured to store instructions that, when executed by the one or more processors, cause the electronic device to be configured to:

start a first application that comprises a first process and a second process, wherein the first process is a process related to a main interface of the first application, and wherein a process name of the second process comprises a process name of the first process and a colon; and switch the first application to background and starting a second application, wherein after the first application is switched to the background and the second application is started, in response to the second process being an auxiliary process and the first process being a main process, the electronic device is further configured to compress a first percentage of data of the first process and compress a second percentage of data of the second process, wherein the first percentage is greater than the second percentage, and the second percentage is greater than zero, and wherein after compressing the data of the first process, the electronic device is further configured to:

start a third application; and clean the second process and skip cleaning the first process after the third application is started.

17. The electronic device of claim 16, wherein after the first application is switched to the background and the second application is started, memory of the electronic device occupied by the second application increases a memory pressure of the electronic device.

18. The electronic device of claim 17, wherein the data of the first process is compressed in response to the increased memory pressure, and wherein the data of the second process is compressed in response to the increased memory pressure.

19. The electronic device of claim 16, wherein the instructions further cause the electronic device to be configured to:

start a fourth application after the second process is cleaned; and dump a part or all of the data of the first process into a swap space of a storage device of the electronic device after the fourth application is started.

20. A non-transitory computer-readable storage medium, comprising instructions that, when executed by one or more processors of an electronic device, cause the electronic device to be configured to:

start a first application that comprises a first process and a second process, wherein the first process is a process related to a main interface of the first application, and wherein a process name of the second process comprises a process name of the first process and a colon; and switch the first application to background and starting a second application, wherein after the first application is switched to the background and the second application is started, in response to the second process being an auxiliary process and the first process being a main process, the electronic device is further configured to compress a first percentage of data of the first process and compress a second percentage of data of the second process subject to compression is a second percentage, wherein the first percentage is greater than the second percentage, and the second percentage is greater than zero, and wherein after compressing the data of the first process, the electronic device is further configured to:

start a third application; and clean the second process and skip cleaning the first process after the third application is started.

* * * * *